United States Patent
Goel

(10) Patent No.: US 8,311,112 B2
(45) Date of Patent: Nov. 13, 2012

(54) SYSTEM AND METHOD FOR VIDEO COMPRESSION USING PREDICTIVE CODING

(75) Inventor: Anurag Goel, Panchkula (IN)

(73) Assignee: Entropic Communications, Inc., San Diego, CA (US)

( * ) Notice: Subject to any disclaimer, the term of this patent is extended or adjusted under 35 U.S.C. 154(b) by 847 days.

(21) Appl. No.: 12/347,841

(22) Filed: Dec. 31, 2008

(65) Prior Publication Data

US 2010/0166069 A1 Jul. 1, 2010

(51) Int. Cl.
*H04N 7/12* (2006.01)

(52) U.S. Cl. ............... 375/240.13; 375/240.12

(58) Field of Classification Search ............ 375/240.12–240.17, 240.23, 240.24
See application file for complete search history.

(56) References Cited

U.S. PATENT DOCUMENTS

2002/0191698 A1* 12/2002 Lee et al. ............ 375/240.12
2006/0171680 A1* 8/2006 Makino ................... 386/95
* cited by examiner

*Primary Examiner* — Gilberto Barron, Jr.
*Assistant Examiner* — Malcolm Cribbs

(57) ABSTRACT

A system and method for video compression performs predictive coding on a macroblock of a video frame such that a set of pixels of the macroblock is coded using some of the pixels from the same video frame as reference pixels and the rest of the macroblock is coded using reference pixels from at least one other video frame.

20 Claims, 14 Drawing Sheets

SYSTEM AND METHOD FOR VIDEO COMPRESSION USING PREDICTIVE CODING

Embodiments of the invention relate generally to video coding systems and methods and, more particularly, to a system and method for video compression.

Video coding systems that utilize predictive coding to perform video compression, such as video coding systems according to Moving Picture Experts Group (MPEG)-4 and H.264 video compression standards, generate a prediction for a macroblock of a current frame by identifying a region or regions of maximum similarity with the macroblock in previously decoded frames. A region of previous decoded frames that is used for generating the prediction is referred to as a reference region and the pixels of the reference region are referred to as reference pixels.

A concern with such video coding systems is the availability of the reference pixels. If new video content appears in the current frame, reference pixels of the new video content may not be available in the previous decoded frames. If the reference pixels of the new video content are not available in the previous decoded frames, the video coding systems search for the reference pixels of the new video content in neighboring frames. However, finding reference pixels in multiple reference frames increases memory requirement, reference frame management load, and motion estimation and motion compensation computation load of the video coding systems. Also, there is usually a practical limit on the number of reference frames that can be used. Additionally, because the reference pixels may not be present in the reference frames, the new video content may not be compressed efficiently. Thus, there is a need for a system and method for video compression that can achieve compression efficiency when new video content appears in the current frame.

A system and method for video compression performs predictive coding on a macroblock of a video frame such that a set of pixels of the macroblock is coded using some of the pixels from the same video frame as reference pixels and the rest of the macroblock is coded using reference pixels from at least one other video frame.

In an embodiment, a method for video compression includes performing predictive coding on a set of pixels of a macroblock of pixels using a first group of reference pixels, where the macroblock of pixels and the first group of reference pixels are from a video frame, and performing predictive coding on the rest of the macroblock of pixels using a second group of reference pixels, where the second group of reference pixels is from at least one other video frame.

In an embodiment, a system for video compression includes an intra-frame coding unit and an inter-frame coding unit. The intra-frame coding unit is configured to perform predictive coding on a set of pixels of a macroblock of pixels using a first group of reference pixels, where the macroblock of pixels and the first group of reference pixels are from a video frame. The inter-frame coding unit is configured to perform predictive coding on the rest of the macroblock of pixels using a second group of reference pixels, where the second group of reference pixels is from at least one other video frame.

In an embodiment, a method for video compression includes performing predictive coding on a rectangular sub-block of pixels of a macroblock of pixels using a first group of reference pixels, where the macroblock of pixels and the first group of reference pixels are from a video frame and the first group of reference pixels borders the left edge and the top edge of the rectangular sub-block of pixels, and performing predictive coding on the rest of the macroblock of pixels using a second group of reference pixels, where the second group of reference pixels is from at least one other video frame.

Other aspects and advantages of embodiments of the present invention will become apparent from the following detailed description, taken in conjunction with the accompanying drawings, depicted by way of example of the principles of the invention.

Figures 6, 7:
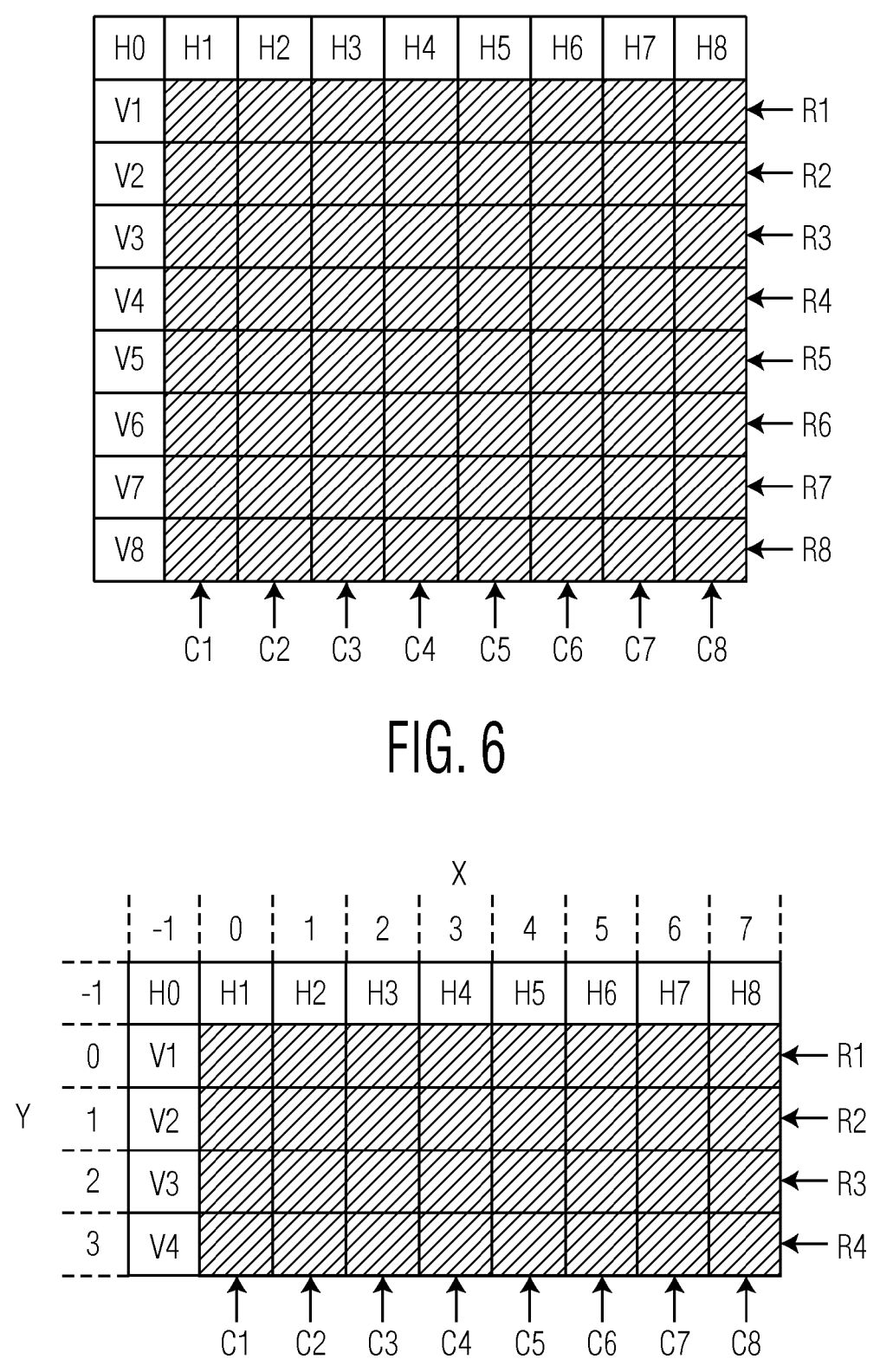

FIG. 6 depicts an 8×8 block of luminance pixels of new video content and corresponding reference pixels of the 8×8 block of luminance pixels in accordance with an embodiment of the invention.

FIG. 7 depicts an 8×4 block of chrominance pixels of new video content and corresponding reference pixels of the 8×4 block of chrominance pixels in accordance with an embodiment of the invention.

Throughout the description, similar reference numbers may be used to identify similar elements.

Figure 1:
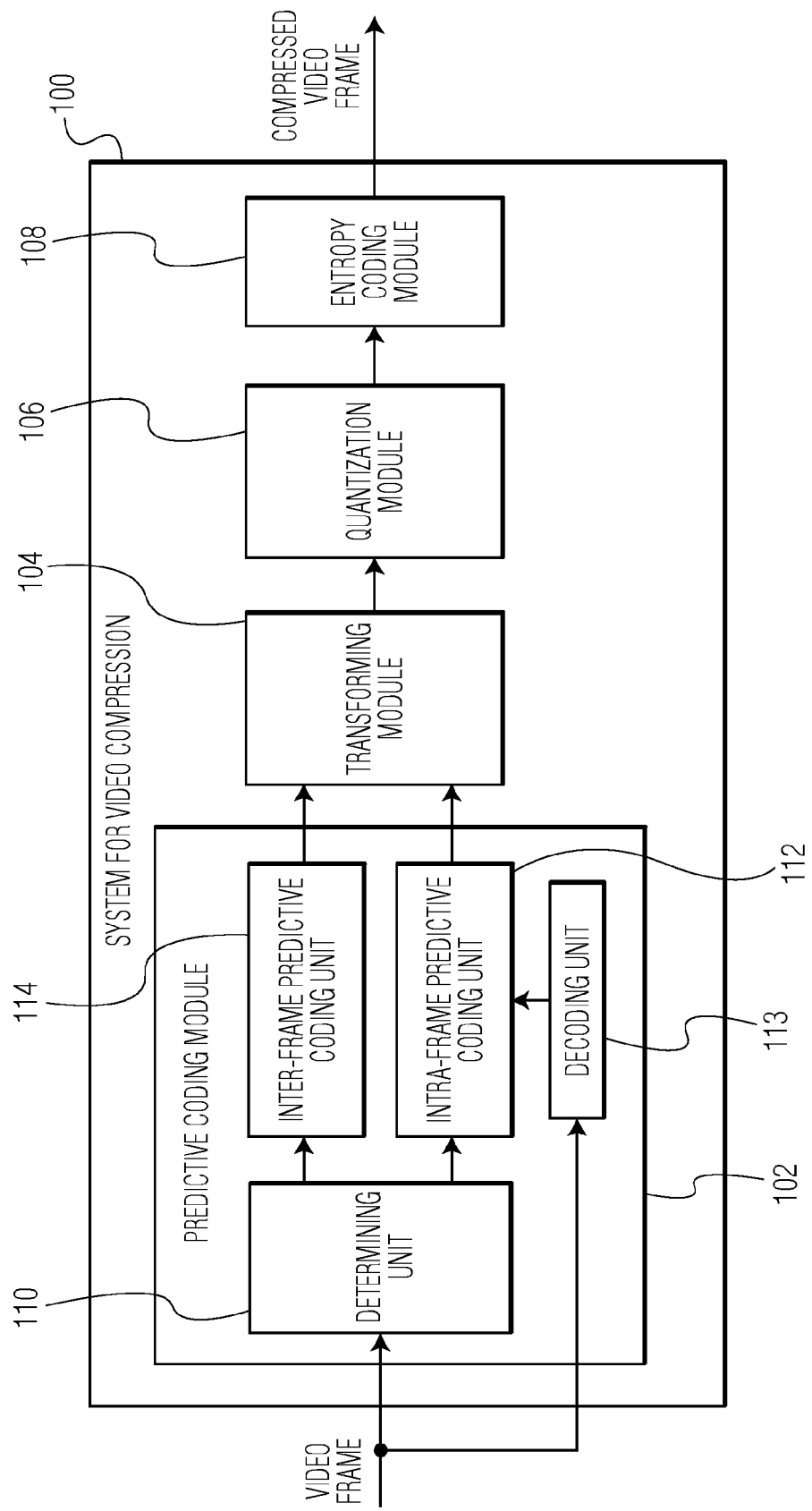
FIG. 1 is a schematic block diagram of a system for video compression in accordance with an embodiment of the invention.

FIG. 1 is a schematic block diagram of a system 100 for video compression in accordance with an embodiment of the invention. The system of FIG. 1 can be used to achieve video compression efficiency when new video content appears in a macroblock of a video frame to be compressed. For example, the system can be used to improve H.264 video compression systems and scalable video codec (SVC) systems. The system can also be used for data archiving and medical imaging. The system of FIG. 1 can be implemented in video encoders and decoders, digital televisions, set top boxes and handheld multimedia devices.

As shown in FIG. 1, the system 100 includes a predictive coding module 102, a transforming module 104, a quantization module 106, and an entropy coding module 108. Although these modules of the system are shown as being separate components, some or all of these modules may be integrated into fewer components in other embodiments. These modules of the system may be implemented in software, hardware, firmware, or a combination of software, hardware, and firmware.

In the embodiment of FIG. 1, the predictive coding module 102 includes a determining unit 110, an intra-frame coding unit 112, a decoding unit 113, and an inter-frame coding unit 114. The predictive coding module is configured to perform predictive coding on a macroblock of a video frame. The macroblock may be a rectangular block of pixels. For example, the macroblock may be a rectangular block of pixels of an YCbCr 4:2:0 color format, which includes a 16×16 block of luminance (luma) pixels "Y" and two corresponding 8×8 blocks of chrominance (chroma) pixels "Cb" and "Cr." Predictive coding may be performed serially on the luminance pixels and the chrominance pixels, for example, first on the luminance pixels and then on the chrominance pixels. In some embodiments, the macroblock may have a color format different from the YCbCr 4:2:0 color format such as a RGB (red, green, and blue) color format, which has different chrominance pixel block sizes.

The determining unit 110 is configured to determine whether new video content appear in the macroblock of the video frame. Under certain circumstances, pixels of new video content may appear in the macroblock. For example, new objects may be introduced into the video frame and hence into the macroblock. New video content may be introduced into the macroblock because video content hidden behind a moving object may be revealed in the macroblock. New video content may also be introduced into the macroblock because of complex rigid body motion, such as rotation, zoom in, and zoom out, of an object or because of complex non-rigid body motion of an object. New video content may also be introduced into the macroblock because of irregular background texture.

The intra-frame coding unit 112 is configured to perform predictive coding on the new video content using reference pixels from the same video frame. That is, the reference pixels are pixels from the same video frame as the macroblock being coded. For example, the intra-frame coding unit may generate a prediction data block for pixels of the new video content using the reference pixels from the video frame and subtract the prediction data block from the pixels of the new video content to produce a residual data block. Details of the intra-frame coding unit are described below with reference to FIGS. 2-9. The reference pixels for the intra-frame coding unit 112 may be compressed.

The decoding unit 113 is configured to decompress and reconstruct the reference pixels. The decoding unit may be configured to perform entropy decoding, inverse quantization, and inverse transformation on the reference pixels. In some embodiments, previously reconstructed reference pixels are input into the decoding unit. Although the decoding unit is shown as a part of the predictive coding module 102, the decoding unit may be separate from the predictive coding module in other embodiments.

The inter-frame coding unit 114 is configured to perform predictive coding on the rest of the macroblock using reference pixels from other video frames. For example, the inter-frame coding unit may generate a prediction data block for pixels of the rest of the macroblock using a reference group of pixels from previous decoded frames and subtract the prediction data block from the pixels of the rest of the macroblock to produce a residual data block.

The transforming module 104, the quantization module 106, and the entropy coding module 108 process the residual data from the predictive coding module 102. The transforming module is configured to transform the residual data to generate transformed residual data. For example, the transforming module may perform a discrete cosine transform and a Hadamard transform on the residual data. The quantization module is configured to quantize the transformed residual data to generate quantized transformed residual data. The entropy coding module is configured to entropy code the quantized transformed residual data. For example, the entropy coding module may process the quantized transformed residual data to generate run-length symbols and then entropy code the run-length symbols.

Pixels of new video content of a macroblock may have different pixel block sizes and different video data types. The new video content may include a single block of pixels. For example, the new video content may include a 4×4 block of pixels, an 8×8 block of pixels, a 4×8 block of pixels, an 8×4 block of pixels, a 16×8 block of pixels, an 8×16 block of pixels, or a 16×16 block of pixels. The new video content may include multiple blocks of pixels. For example, the new video content may include three 8×8 blocks of pixels or three 4×4 blocks of pixels. The new video content may include pixels of a single video data type. For example, the new video content may includes luminance pixels or chrominance pixels. The new video content may include pixels of multiple video data types. For example, the new video content may includes luminance pixels and chrominance pixels. According to the pixel block size and the video data type of the pixels of new video content, the intra-frame coding unit 112 performs predictive coding on the new video content of a macroblock of a video frame using reference pixels from the video frame.

For certain pixel block sizes and video data types of the pixels of the new video content, such as a 16×16 block of luminance pixels, an 8×8 block of chrominance pixels, a 4×4 block of luminance pixels, and an 8×8 block of luminance pixels, the intra-frame coding unit 112 of FIG. 1 may perform predictive coding on the new video content in intra-frame prediction modes according to H.264 video compression standard. Four intra-frame prediction modes for a 16×16 block of luminance pixels or an 8×8 block of chrominance pixels according to H.264 video compression standard are described below with reference to FIG. 2. Nine intra-frame prediction modes for a 4×4 block of luminance pixels or an 8×8 block of luminance pixels according to H.264 video compression standard are described with reference to FIG. 3.

Figure 2:
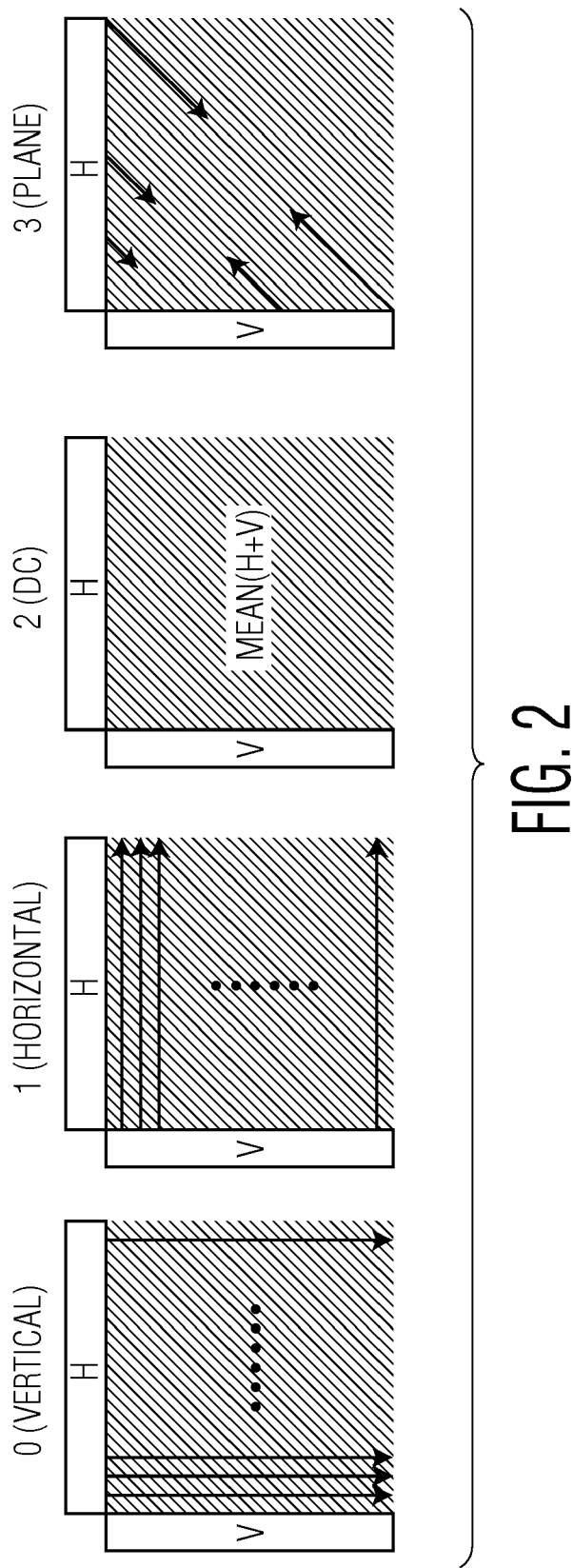
FIG. 2 depicts four intra-frame prediction modes for a 16×16 block of luminance pixels or an 8×8 block of chrominance pixels according to H.264 video compression standard.

FIG. 2 depicts four intra-frame prediction modes for a 16×16 block of luminance pixels or an 8×8 block of chrominance pixels according to H.264 video compression standard. Shaded region represents pixels of the new video content and white region labeled with "H" and "V" represents reference pixels. The pixels of the new video content and the corresponding reference pixels are from the same video frame. As shown in FIG. 2, the four intra-frame prediction modes include a vertical prediction mode, a horizontal prediction mode, a DC prediction mode, and a plane prediction mode. In the four intra-frame prediction modes, top horizontal (H) reference luminance pixel blocks and left vertical (V) reference luminance pixel blocks are used to perform predictive coding on the 16×16 block of luminance pixels or on the 8×8 block of chrominance pixels. In the vertical prediction mode, predictive coding is performed on the 16×16 block of luminance pixels or on the 8×8 block of chrominance pixels along the vertical direction using the top reference pixel blocks. In the horizontal prediction mode, predictive coding is performed on the 16×16 block of luminance pixels or on the 8×8 block of chrominance pixels along the horizontal direction using the left reference pixel blocks. In the DC prediction mode, predictive coding is performed on the 16×16 block of luminance pixels or on the 8×8 block of chrominance pixels using a mean value calculated from the top reference pixel blocks and the left reference pixel blocks. In the plane prediction mode, predictive coding is performed on the 16×16 block of luminance pixels or on the 8×8 block of chrominance pixels using a linear function of the top reference pixel blocks and the left reference pixel blocks.

Figure 3:
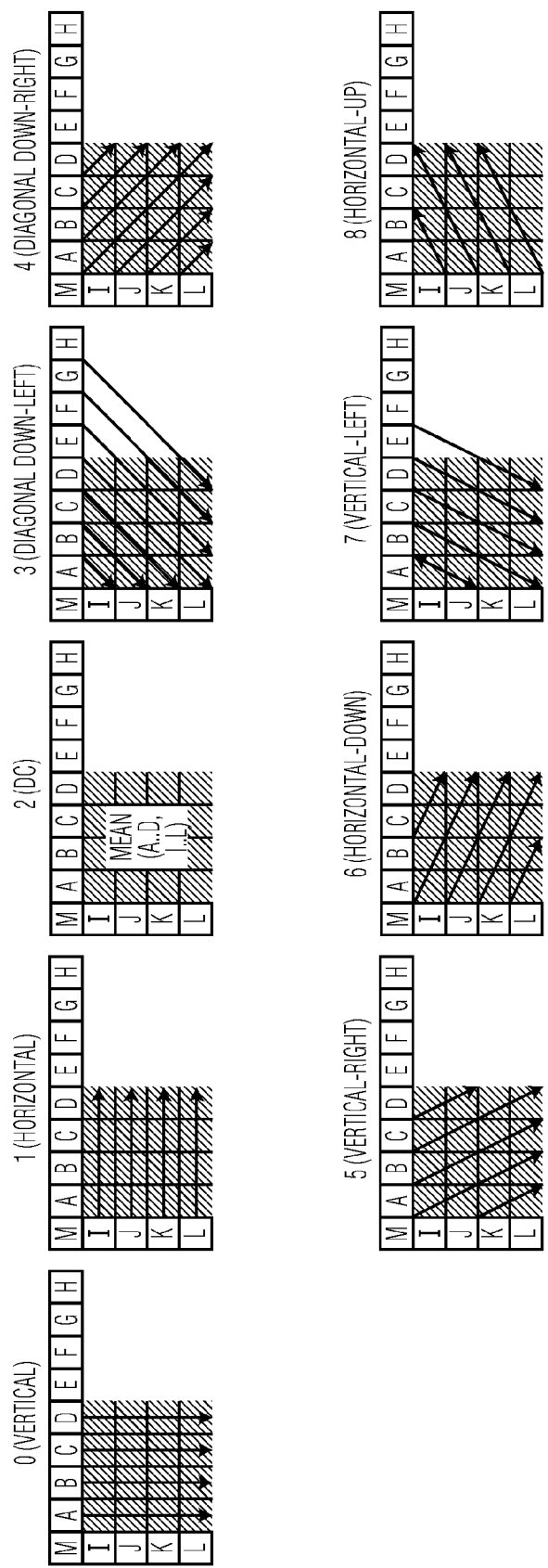
FIG. 3 depicts nine intra-frame prediction modes for a 4×4 block of luminance pixels or an 8×8 block of luminance pixels according to H.264 video compression standard.

FIG. 3 depicts nine intra-frame prediction modes for a 4×4 block of luminance pixels or an 8×8 block of luminance pixels according to H.264 video compression standard. Shaded blocks represent pixels of the new video content and white blocks represent reference pixels. The pixels of the new video content and the corresponding reference pixels are from the same video frame. In the case of performing predictive coding on the 4×4 block of luminance pixels, each of the shaded block contains a pixel of the new video content and each of the reference blocks A-M contains a reference luminance pixel. In the case of performing predictive coding on the 8×8 block of luminance pixels, each of the shaded block contains a 2×2 block of pixels of the new video content and each of the reference blocks A-M contains two reference luminance pixels. As shown in FIG. 3, the nine intra-frame prediction modes include a vertical prediction mode, a horizontal prediction mode, a DC prediction mode, a diagonal down-left prediction mode, a diagonal down-right prediction mode, a vertical-right prediction mode, a horizontal-down prediction mode, a vertical-left prediction mode, and a horizontal-up prediction mode. In the vertical prediction mode, predictive coding is performed on the 4×4 block of luminance pixels or on the 8×8 block of luminance pixels along the vertical direction using top reference blocks A-D. In the horizontal prediction mode, predictive coding is performed on the 4×4 block of luminance pixels or on the 8×8 block of luminance pixels along the horizontal direction using left reference blocks I-L. In the DC prediction mode, predictive coding is performed on the 4×4 block of luminance pixels or on the 8×8 block of luminance pixels using the mean of the top reference blocks A-D and the left reference blocks I-L. In the diagonal down-left prediction mode, predictive coding is performed on the 4×4 block of luminance pixels or on the 8×8 block of luminance pixels along the diagonal down-left direction using the reference blocks A-M. In the diagonal down-right prediction mode, predictive coding is performed on the 4×4 block of luminance pixels or on the 8×8 block of luminance pixels along the diagonal down-right direction using the reference blocks A-M. In the vertical-right prediction mode, predictive coding is performed on the 4×4 block of luminance pixels or on the 8×8 block of luminance pixels along the vertical-right direction using the reference blocks A-M. In the horizontal-down prediction mode, predictive coding is performed on the 4×4 block of luminance pixels or on the 8×8 block of luminance pixels along the horizontal-down direction using the reference blocks A-M. In the vertical-left prediction mode, predictive coding is performed on the 4×4 block of luminance pixels or on the 8×8 block of luminance pixels along the vertical-left direction using the reference blocks A-M. In the horizontal-up prediction mode, predictive coding is performed on the 4×4 block of luminance pixels or on the 8×8 block of luminance pixels along the horizontal-up direction using the reference blocks A-M.

For certain pixel block sizes and video data types of the pixels of the new video content, such as a 16×8 block, 8×16 block, or 8×8 block of luminance pixels, or an 8×4 block, 4×8 block, or 4×4 block of chrominance pixels, the intra-frame coding unit 112 of FIG. 1 may perform predictive coding on the new video content in intra-frame prediction modes different from the intra-frame prediction modes shown in FIGS. 2-3. Four exemplary intra-frame prediction modes for a 16×8 block of luminance pixels of FIG. 4, four exemplary intra-frame prediction modes for an 8×16 block of luminance pixels of FIG. 5, and four exemplary intra-frame prediction modes for an 8×8 block of luminance pixels of FIG. 6 are described below. Four exemplary intra-frame prediction modes for an 8×4 block of chrominance pixels of FIG. 7, four exemplary intra-frame prediction modes for a 4×8 block of chrominance pixels of FIG. 8, and four exemplary intra-frame prediction modes for a 4×4 block of chrominance pixels of FIG. 9 are described below as well.

Figure 4:
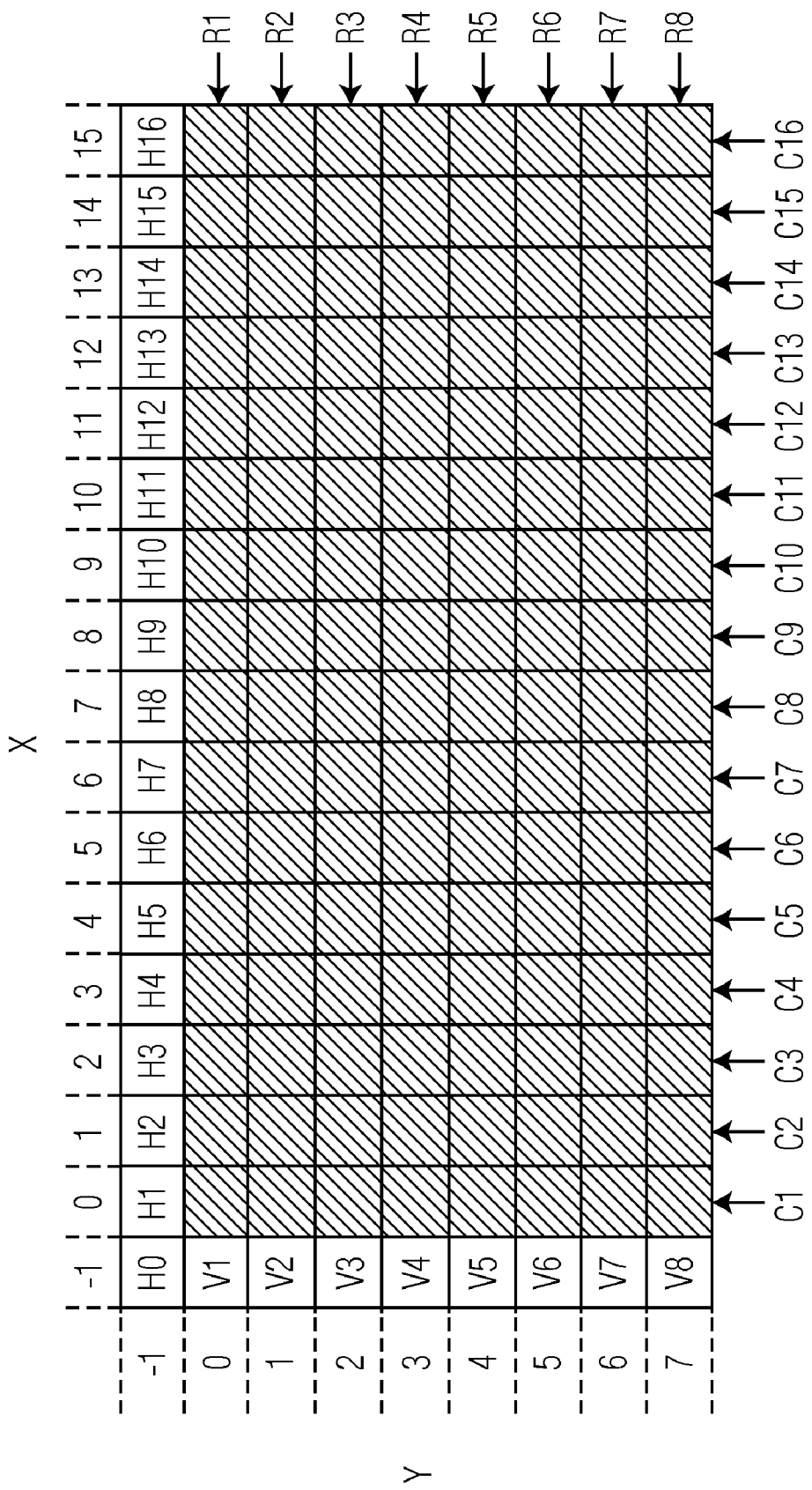
FIG. 4 depicts a 16×8 block of luminance pixels of new video content and corresponding reference pixels of the 16×8 block of luminance pixels in accordance with an embodiment of the invention.

FIG. 4 depicts a 16×8 block of luminance pixels of new video content and corresponding reference pixels of the 16×8 block of luminance pixels. The 16×8 block of luminance pixels and the corresponding reference pixels are from the same video frame. As shown in FIG. 4, each shaded box represents a pixel of the new video content and each white box represents a reference pixel. The 16×8 block of luminance pixels includes sixteen columns C1-C16 of pixels, where each column of pixels includes eight pixels. The 16×8 block of luminance pixels includes eight rows R1-R8 of pixels, where each row of pixels includes sixteen pixels. The reference pixels include left vertical reference pixels V1-V8 and top horizontal reference pixels H0-H16. The four exemplary intra-frame prediction modes used by the intra-frame coding unit 112 for the 16×8 block of luminance pixels of FIG. 4 include a vertical prediction mode, a horizontal prediction mode, a DC prediction mode, and a plane prediction mode.

In the vertical prediction mode, predictive coding is performed on the 16×8 block of luminance pixels along the vertical direction using the top reference pixels H1-H16. Each top reference pixel is used to perform predictive coding on one of the sixteen columns C1-C16 of pixels bordering the top reference pixel along the vertical direction. For example, the top reference pixel H1 is used to perform predictive coding on the far left column C1 of pixels. Using the top reference pixel H1, the intra-frame coding unit 112 of FIG. 1 generates prediction data for each pixel of the far left column C1 of pixels and subtracts the prediction data from the corresponding pixel of the far left column C1 of pixels to produce residual data. As another example, the top reference pixel H16 is used to perform predictive coding on the far right column C16 of pixels. Using the top reference pixel H16, the intra-frame coding unit generates prediction data for each pixel of the far right column C16 of pixels and subtracts the prediction data from the corresponding pixel of the far right column C16 of pixels to produce residual data.

In the horizontal prediction mode, predictive coding is performed on the 16×8 block of luminance pixels along the horizontal direction using the left reference pixels V1-V8. Each left reference pixel is used to perform predictive coding on one of the eight rows R1-R8 of pixels bordering the left reference pixel along the horizontal direction. For example, the left reference pixel V1 is used to perform predictive coding on the top row R1 of pixels. Using the left reference pixel V1, the intra-frame coding unit 112 generates prediction data for each pixel of the top row R1 of pixels and subtracts the prediction data from the corresponding pixel of the top row R1 of pixels to produce residual data. As another example, the left reference pixel V8 is used to perform predictive coding on the bottom row R8 of pixels. Using the left reference pixel V8, the intra-frame coding unit generates prediction data for each pixel of the bottom row R8 of pixels and subtracts the prediction data from corresponding pixel of the bottom row R8 of pixels to produce residual data.

In the DC prediction mode, predictive coding is performed on the 16×8 block of luminance pixels using a mean value of the top reference pixels H1-H16 and a mean value of the left reference pixels V1-V8 according to equations described below. For example, the intra-frame coding unit 112 may generate a DC prediction value for each pixel of the 16×8 block of luminance pixels and subtract the DC prediction value from the pixel to produce residual data. The mean value of the top reference pixels H1-H16, Mean_H, can be expressed as:

$$\text{Mean}\_H = (\text{Sum}(H1 \text{ to } H16) + 8) >> 4, \quad (1)$$

where ">>" indicates division by two (2) raised to shift value. The mean value of the left reference pixels V1-V8, Mean_V, can be expressed as:

$$\text{Mean}\_V = (\text{Sum}(V1 \text{ to } V8) + 4) >> 3. \quad (2)$$

The DC prediction value of each pixel of the 16×8 block of luminance pixels, DC_value, can be expressed as:

$$DC\_\text{value} = (\text{Mean}\_V + \text{Mean}\_H + 1) >> 1. \quad (3)$$

In the plane prediction mode, predictive coding is performed on the 16×8 block of luminance pixels using a linear function of the top reference pixels H0-H16 and the left reference pixels V1-V8. For example, the intra-frame coding unit 112 may generate a plane prediction value for each pixel of the 16×8 block of luminance pixels and subtract the plane prediction value of the pixel from the pixel to produce residual data. For a pixel at position (x,y), where x is an integer ranging from zero to fifteen and y is an integer ranging from zero to seven, the plane prediction value of the pixel is referred to as P[x, y]. The plane prediction value of a pixel at position (x,y), P[x, y], can be expressed as:

$$P[x,y] = \text{Clip1}Y((a+b*(x-7)+c*(y-3)+16)>>5) \quad (4)$$

$$a = 16*(p[15, -1]+p[-1, 7])$$
$$b = (5*H+32)>>6$$
$$c = (17*V+16)>>5$$
$$H = \text{Sum}((x'+1)*(p[8+x', -1]-p[6-x', -1])), x'=0 \text{ to } 7$$
$$V = \text{Sum}((y'+1)*(p[-1, 4+y']-p[-1, 2-y'])), y'=0 \text{ to } 3$$

$$\text{Clip1}Y(x) = \text{Clip3}(0,(1<<\text{BitDepth}Y)-1, x)$$

$$\text{Clip3}(x, y, z) = x \text{ if } z<x$$

y if Z>y
z otherwise

BitDepthY=8, Luminance pixel Y is represented in 8 bits for YCbCr 4:2:0, where each of the top reference pixels H0-H16 is referred to as p [m,−1], where m is an integer ranging from minus one to fifteen, and each of the left reference pixels V1-V8 is referred to as p [−1,n], where n is an integer ranging from zero to seven.

Figure 5:
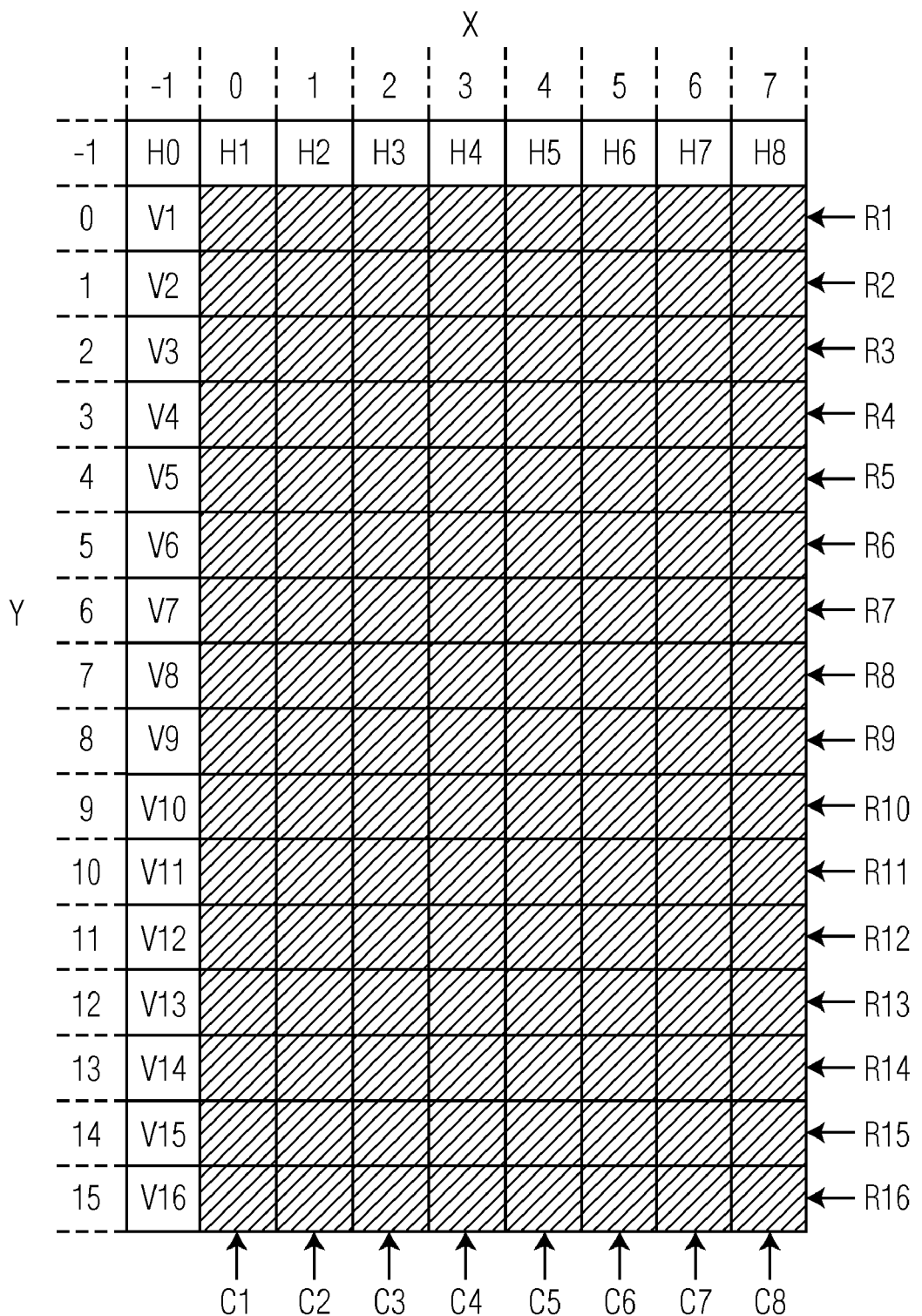
FIG. 5 depicts an 8×16 block of luminance pixels of new video content and corresponding reference pixels of the 8×16 block of luminance pixels in accordance with an embodiment of the invention.

FIG. 5 depicts an 8×16 block of luminance pixels of new video content and corresponding reference pixels of the 8×16 block of luminance pixels. The 8×16 block of luminance pixels and the corresponding reference pixels are from the same video frame. As shown in FIG. 5, each shaded box represents a pixel of the new video content and each white box represents a reference pixel. The 16×8 block of luminance pixels includes eight columns C1-C8 of pixels, where each column of pixels includes sixteen pixels. The 8×16 block of luminance pixels includes sixteen rows R1-R16 of pixels, where each row of pixels includes eight pixels. The reference pixels include left vertical reference pixels V1-V16 and top horizontal reference pixels H0-H8. The four exemplary intra-frame prediction modes used by the intra-frame coding unit 112 for the 8×16 block of luminance pixels of FIG. 5 include a vertical prediction mode, a horizontal prediction mode, a DC prediction mode, and a plane prediction mode.

In the vertical prediction mode, predictive coding is performed on the 8×16 block of luminance pixels along the vertical direction using the top reference pixels H1-H8. Each top reference pixel is used to perform predictive coding on one of the eight columns C1-C8 of pixels bordering the top reference pixel along the vertical direction. For example, the top reference pixel H1 is used to perform predictive coding on the far left column C1 of pixels. Using the top reference pixel H1, the intra-frame coding unit 112 generates prediction data, where prediction data=top reference pixel H1, for each pixel of the far left column C1 of pixels and subtracts the prediction data from the corresponding pixel of the far left column C1 of pixels to produce residual data. As another example, the top reference pixel H8 is used to perform predictive coding on the far right column C8 of pixels. Using the top reference pixel H8, the intra-frame coding unit generates prediction data, where prediction data=top reference pixel H8, for each pixel of the far right column C8 of pixels and subtracts the prediction data from the corresponding pixel of the far right column C8 of pixels to produce residual data.

In the horizontal prediction mode, predictive coding is performed on the 8×16 block of luminance pixels along the horizontal direction using the left reference pixels V1-V16. Each left reference pixel is used to perform predictive coding on one of the sixteen rows R1-R16 of pixels bordering the left reference pixel along the horizontal direction. For example, the left reference pixel V1 is used to perform predictive coding on the top row R1 of pixels. Using the left reference pixel V1, the intra-frame coding unit 112 generates prediction data, where prediction data=left reference pixel V1, for each pixel of the top row R1 of pixels and subtracts the prediction data from the corresponding pixel of the top row R1 of pixels to produce residual data. As another example, the left reference pixel V16 is used to perform predictive coding on the bottom row R16 of pixels. Using the left reference pixel V16, the intra-frame coding unit generates prediction data, where prediction data=left reference pixel V16, for each pixel of the bottom row R16 of pixels and subtracts the prediction data from corresponding pixel of the bottom row R16 of pixels to produce residual data.

In the DC prediction mode, predictive coding is performed on the 8×16 block of luminance pixels using a mean value of the top reference pixels H1-H8 and a mean value of the left reference pixels V1-V16 according to equations described below. For example, the intra-frame coding unit 112 may generate a DC prediction value for each pixel of the 8×16 block of luminance pixels and subtract the DC prediction value from the pixel to produce residual data. The mean value of the top reference pixels H1-H8, Mean_H, can be expressed as:

$$\text{Mean\_}H = (\text{Sum}(H1 \text{ to } H8) + 4) >> 3. \quad (5)$$

The mean value of the left reference pixels V1-V16, Mean_V, can be expressed as:

$$\text{Mean\_}V = (\text{Sum}(V1 \text{ to } V16) + 8) >> 4. \quad (6)$$

The DC prediction value of each pixel of the 8×16 block of luminance pixels, DC_value, can be expressed as:

$$DC\_\text{value} = (\text{Mean\_}V + \text{Mean\_}H + 1) >> 1. \quad (7)$$

In the plane prediction mode, predictive coding is performed on the 8×16 block of luminance pixels using a linear function of the top reference pixels H0-H8 and the left reference pixels V1-V16. For example, the intra-frame coding unit 112 may generate a plane prediction value for each pixel of the 8×16 block of luminance pixels and subtract the plane prediction value of the pixel from the pixel to produce residual data. For a pixel at position (x,y), where x is an integer ranging from zero to seven and y is an integer ranging from zero to fifteen, the plane prediction value of the pixel is referred to as P[x, y]. The plane prediction value of a pixel at position (x,y), P[x, y], can be expressed as:

$$P[x,y] = \text{Clip1}Y((a + b*(x-3) + c*(y-7) + 16) >> 5) \quad (8)$$

a=16*(p[−1, 15]+p[7, −1])
b=(17*H+16)>>5
c=(5*V+32)>>6
H=Sum((x'+1)*(p[4+x', −1]−p[2−x', −1])), x'=0 to 3
V=Sum((y'+1)*(p[−1, 8+y']−p[−1, 6−y'])), y'=0 to 7, where each of the top reference pixels H0-H8 is referred to as p [m,−1], where m is an integer ranging from minus one to seven, and each of the left reference pixels V1-V16 is referred to as p [−1,n], where n is an integer ranging from zero to fifteen.

FIG. 6 depicts an 8×8 block of luminance pixels of new video content and corresponding reference pixels of the 8×8 block of luminance pixels. The 8×8 block of luminance pixels and the corresponding reference pixels are from the same video frame. As shown in FIG. 6, each shaded box represents a pixel of the new video content and each white box represents a reference pixel. The 8×8 block of luminance pixels includes eight columns C1-C8 of pixels, where each column of pixels includes eight pixels. The 8×8 block of luminance pixels includes eight rows R1-R8 of pixels, where each row of pixels includes eight pixels. The reference pixels include left vertical reference pixels V1-V8 and top horizontal reference pixels H0-H8. The four exemplary intra-frame prediction modes used by the intra-frame coding unit 112 for the 8×8 block of luminance pixels of FIG. 6 include a vertical prediction mode, a horizontal prediction mode, a DC prediction mode, and a plane prediction mode.

In the vertical prediction mode, predictive coding is performed on the 8×8 block of luminance pixels along the vertical direction using the top reference pixels H1-H8. Each top reference pixel is used to perform predictive coding on one of the eight columns C1-C8 of pixels bordering the top reference pixel along the vertical direction. For example, the top reference pixel H1 is used to perform predictive coding on the far left column C1 of pixels. Using the top reference pixel H1, the intra-frame coding unit 112 generates prediction data for each pixel of the far left column C1 of pixels and subtracts the prediction data from the corresponding pixel of the far left column C1 of pixels to produce residual data. As another example, the top reference pixel H8 is used to perform predictive coding on the far right column C8 of pixels. Using the top reference pixel H8, the intra-frame coding unit generates prediction data for each pixel of the far right column C8 of pixels and subtracts the prediction data from the corresponding pixel of the far right column C8 of pixels to produce residual data.

In the horizontal prediction mode, predictive coding is performed on the 8×8 block of luminance pixels along the horizontal direction using the left reference pixels V1-V8. Each left reference pixel is used to perform predictive coding on one of the eight rows R1-R8 of pixels bordering the left reference pixel along the horizontal direction. For example, the left reference pixel V1 is used to perform predictive coding on the top row R1 of pixels. Using the left reference pixel V1, the intra-frame coding unit 112 generates prediction data for each pixel of the top row R1 of pixels and subtracts the prediction data from the corresponding pixel of the top row R1 of pixels to produce residual data. As another example, the left reference pixel V8 is used to perform predictive coding on the bottom row R8 of pixels. Using the left reference pixel V8, the intra-frame coding unit generates prediction data for each pixel of the bottom row R8 of pixels and subtracts the prediction data from corresponding pixel of the bottom row R8 of pixels to produce residual data.

In the DC prediction mode, predictive coding is performed on the 8×8 block of luminance pixels using a mean value of the top reference pixels H1-H8 and the left reference pixels V1-V8. For example, the intra-frame coding unit 112 may generate a DC prediction value for each pixel of the 8×8 block of luminance pixels and subtract the DC prediction value from the pixel to produce residual data.

In the plane prediction mode, predictive coding is performed on the 8×8 block of luminance pixels using a linear function of the top reference pixels H0-H8 and the left reference pixels V1-V8. For example, the intra-frame coding unit 112 may generate a plane prediction value for each pixel of the 8×8 block of luminance pixels according to the plane prediction mode of 8×8 chrominance pixels as specified in H.264 video coding standard and subtract the plane prediction value of the pixel from the pixel to produce residual data.

FIG. 7 depicts an 8×4 block of chrominance pixels of new video content and corresponding reference pixels of the 8×4 block of chrominance pixels. The 8×4 block of chrominance pixels and the corresponding reference pixels are from the same video frame. As shown in FIG. 7, each shaded box represents a pixel of the new video content and each white box represents a reference pixel. The 8×4 block of chrominance pixels includes eight columns C1-C8 of pixels, where each column of pixels includes four pixels. The 8×4 block of chrominance pixels includes four rows R1-R4 of pixels, where each row of pixels includes eight pixels. The reference pixels include left vertical reference pixels V1-V4 and top horizontal reference pixels H0-H8. The four exemplary intra-frame prediction modes used by the intra-frame coding unit 112 for the 8×4 block of chrominance pixels of FIG. 7 include a vertical prediction mode, a horizontal prediction mode, a DC prediction mode, and a plane prediction mode.

In the vertical prediction mode, predictive coding is performed on the 8×4 block of chrominance pixels along the vertical direction using the top reference pixels H1-H8. Each top reference pixel is used to perform predictive coding on one of the eight columns C1-C8 of pixels bordering the top reference pixel along the vertical direction. For example, the top reference pixel H1 is used to perform predictive coding on the far left column C1 of pixels. Using the top reference pixel H1, the intra-frame coding unit 112 generates prediction data, where prediction data=top reference pixel H1, for each pixel of the far left column C1 of pixels and subtracts the prediction data from the corresponding pixel of the far left column C1 of pixels to produce residual data. As another example, the top reference pixel H8 is used to perform predictive coding on the far right column C8 of pixels. Using the top reference pixel H8, the intra-frame coding unit generates prediction data, where prediction data=top reference pixel H8, for each pixel of the far right column C8 of pixels and subtracts the prediction data from the corresponding pixel of the far right column C8 of pixels to produce residual data.

In the horizontal prediction mode, predictive coding is performed on the 8×4 block of chrominance pixels along the horizontal direction using the left reference pixels V1-V4. Each left reference pixel is used to perform predictive coding on one of the four rows R1-R4 of pixels bordering the left reference pixel along the horizontal direction. For example, the left reference pixel V1 is used to perform predictive coding on the top row R1 of pixels. Using the left reference pixel V1, the intra-frame coding unit 112 generates prediction data, where prediction data=left reference pixel V1, for each pixel of the top row R1 of pixels and subtracts the prediction data from the corresponding pixel of the top row R1 of pixels to produce residual data. As another example, the left reference pixel V4 is used to perform predictive coding on the bottom row R4 of pixels. Using the left reference pixel V4, the intra-frame coding unit generates prediction data, where prediction data=left reference pixel V4, for each pixel of the bottom row R4 of pixels and subtracts the prediction data from corresponding pixel of the bottom row R4 of pixels to produce residual data.

In the DC prediction mode, predictive coding is performed on the left 4×4 block of 8×4 block of chrominance pixels using a mean value of the top reference pixels H1-H4 and the left reference pixels V1-V4. Predictive coding on right 4×4 block of 8×4 block is performed using a mean value of the top reference pixels H4-H8 and left reference pixels V1-V4. For example, the intra-frame coding unit 112 may generate a DC prediction value for each pixel of the 8×4 block of chrominance pixels and subtract the DC prediction value from the pixel to produce residual data.

In the plane prediction mode, predictive coding is performed on the 8×4 block of chrominance pixels using a linear function of the top reference pixels H0-H8 and the left reference pixels V1-V4. For example, the intra-frame coding unit 112 may generate a plane prediction value for each pixel of the 8×4 block of chrominance pixels and subtract the plane prediction value of the pixel from the pixel to produce residual data. For a pixel at position (x,y), where x is an integer ranging from zero to seven and y is an integer ranging from zero to three, the plane prediction value of the pixel is referred to as P[x, y]. The plane prediction value of a pixel at position (x,y), P[x, y], can be expressed as:

$$P[x, y] = Clip1C((a + b*(x-3) + c*(y-1) + 16) >> 5) \quad (9)$$

$a = 16*(p[7, -1] + p[-1, 3])$
$b = (17*H + 16) >> 5$
$c = (54*V + 8) >> 4$
$H = Sum((x'+1)*(p[4+x', -1] - p[2-x', -1])), x' = 0 \text{ to } 3$
$V = Sum((y'+1)*(p[-1, 2+y'] - p[-1, 0-y'])), y' = 0 \text{ to } 1$,
Clip1C is same as Clip1Y, except that BitDepthC is used instead of BitDepthY, where each of the top reference pixels H0-H8 is referred to as p [m,−1], where m is an integer ranging from minus one to seven, and each of the left reference pixels V1-V4 is referred to as p [−1,n], where n is an integer ranging from zero to three.

Figure 8:
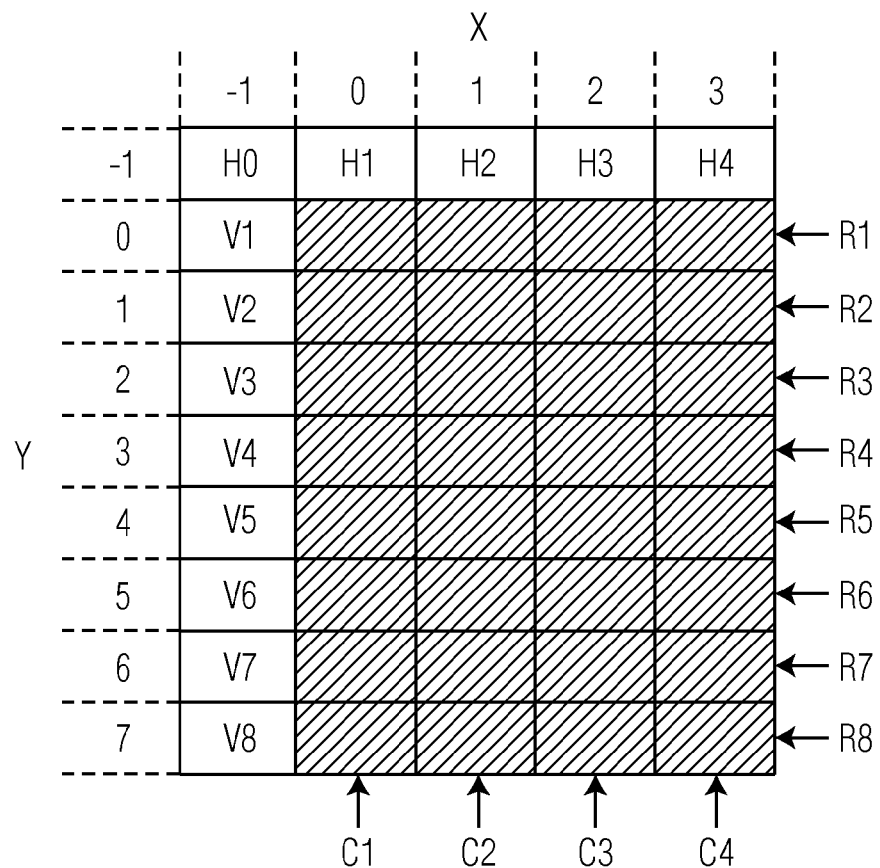
FIG. 8 depicts a 4×8 block of chrominance pixels of new video content and corresponding reference pixels of the 4×8 block of chrominance pixels in accordance with an embodiment of the invention.
Figure 9:
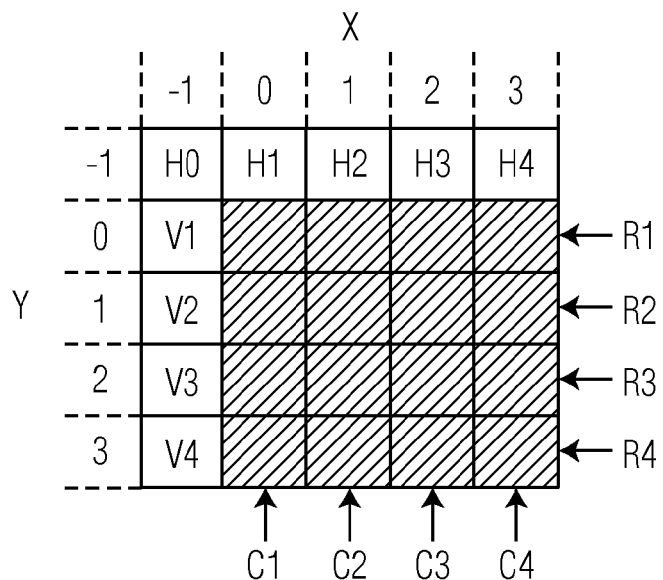
FIG. 9 depicts a 4×4 block of chrominance pixels of new video content and corresponding reference pixels of the 4×4 block of chrominance pixels in accordance with an embodiment of the invention.

FIG. 8 depicts a 4×8 block of chrominance pixels of new video content and corresponding reference pixels of the 4×8 block of chrominance pixels. The 4×8 block of chrominance pixels and the corresponding reference pixels are from the same video frame. As shown in FIG. 8, each shaded box represents a pixel of the new video content and each white box represents a reference pixel. The 4×8 block of chrominance pixels includes four columns C1-C4 of pixels, where each column of pixels includes eight pixels. The 4×8 block of chrominance pixels includes eight rows R1-R8 of pixels, where each row of pixels includes four pixels. The reference pixels include left vertical reference pixels V1-V8 and top horizontal reference pixels H0-H4. The four exemplary intra-frame prediction modes used by the intra-frame coding unit 112 for the 4×8 block of chrominance pixels of FIG. 8 include a vertical prediction mode, a horizontal prediction mode, a DC prediction mode, and a plane prediction mode.

In the vertical prediction mode, predictive coding is performed on the 4×8 block of chrominance pixels along the vertical direction using the top reference pixels H1-H4. Each top reference pixel is used to perform predictive coding on one of the four columns C1-C4 of pixels bordering the top reference pixel along the vertical direction. For example, the top reference pixel H1 is used to perform predictive coding on the far left column C1 of pixels. Using the top reference pixel H1, the intra-frame coding unit 112 generates prediction data, where prediction data=top reference pixel H1, for each pixel of the far left column C1 of pixels and subtracts the prediction data from the corresponding pixel of the far left column C1 of pixels to produce residual data. As another example, the top reference pixel H4 is used to perform predictive coding on the far right column C4 of pixels. Using the top reference pixel H4, the intra-frame coding unit generates prediction data, where prediction data=top reference pixel H4, for each pixel of the far right column C4 of pixels and subtracts the prediction data from the corresponding pixel of the far right column C4 of pixels to produce residual data.

In the horizontal prediction mode, predictive coding is performed on the 4×8 block of chrominance pixels along the horizontal direction using the left reference pixels V1-V8. Each left reference pixel is used to perform predictive coding on one of the eight rows R1-R8 of pixels bordering the left reference pixel along the horizontal direction. For example, the left reference pixel V1 is used to perform predictive coding on the top row of R1 pixels. Using the left reference pixel V1, the intra-frame coding unit 112 generates prediction data, where prediction data=left reference pixel V1, for each pixel of the top row R1 of pixels and subtracts the prediction data from the corresponding pixel of the top row R1 of pixels to produce residual data. As another example, the left reference pixel V8 is used to perform predictive coding on the bottom row R8 of pixels. Using the left reference pixel V8, the intra-frame coding unit generates prediction data, where prediction data=left reference pixel V8, for each pixel of the bottom row R8 of pixels and subtracts the prediction data from corresponding pixel of the bottom row R8 of pixels to produce residual data.

In the DC prediction mode, predictive coding is performed on the top 4×4 block of 4×8 block of chrominance pixels using a mean value of the top reference pixels H1-H4 and the left reference pixels V1-V4. Predictive coding on bottom 4×4 block of 4×8 block is performed using a mean value of the top reference pixels H1-H4 and the left reference pixels V4-V8. For example, the intra-frame coding unit 112 may generate a DC prediction value for each pixel of the 4×8 block of chrominance pixels and subtract the DC prediction value from the pixel to produce residual data.

In the plane prediction mode, predictive coding is performed on the 4×8 block of chrominance pixels using a linear function of the top reference pixels H0-H4 and the left reference pixels V1-V8. For example, the intra-frame coding unit 112 may generate a plane prediction value for each pixel of the 4×8 block of chrominance pixels and subtract the plane prediction value of the pixel from the pixel to produce residual data. For a pixel at position (x,y), where x is an integer ranging from zero to three and y is an integer ranging from zero to seven, the plane prediction value of the pixel is referred to as P[x, y]. The plane prediction value of a pixel at position (x,y), P[x, y], can be expressed as:

$$P[x,y] = \text{Clip1}C((a + b*(x-1) + c*(y-3) + 16) >> 5) \quad (10)$$

$a = 16*(p[-1, 7] + p[3, -1])$
$b = (54*H + 8) >> 4$
$c = (17*V + 16) >> 5$
$H = \text{Sum}((x'+1)*(p[2+x', -1] - p[0-x', -1])), x'=0 \text{ to } 1$
$V = \text{Sum}((y'+1)*(p[-1, 4+y'] - p[-1, 2-y'])), y'=0 \text{ to } 3$,
where each of the top reference pixels H0-H4 is referred to as p [m,−1], where m is an integer ranging from minus one to three, and each of the left reference pixels V1-V8 is referred to as p [−1,n], where n is an integer ranging from zero to seven.

FIG. 9 depicts a 4×4 block of chrominance pixels of new video content and corresponding reference pixels of the 4×4 block of chrominance pixels. The 4×4 block of chrominance pixels and the corresponding reference pixels are from the same video frame. As shown in FIG. 9, each shaded box represents a pixel of the new video content and each white box represents a reference pixel. The 4×4 block of chrominance pixels includes four columns C1-C4 of pixels, where each column of pixels includes four pixels. The 4×4 block of chrominance pixels includes four rows R1-R4 of pixels, where each row of pixels includes four pixels. The reference pixels include left vertical reference pixels V1-V4 and top horizontal reference pixels H0-H4. The four exemplary intra-frame prediction modes used by the intra-frame coding unit 112 for the 4×4 block of chrominance pixels of FIG. 9 include a vertical prediction mode, a horizontal prediction mode, a DC prediction mode, and a plane prediction mode.

In the vertical prediction mode, predictive coding is performed on the 4×4 block of chrominance pixels along the vertical direction using the top reference pixels H1-H4. Each top reference pixel is used to perform predictive coding on one of the four columns C1-C4 of pixels bordering the top reference pixel along the vertical direction. For example, the top reference pixel H1 is used to perform predictive coding on the far left column C1 of pixels. Using the top reference pixel H1, the intra-frame coding unit 112 generates prediction data, where prediction data=top reference pixel H1, for each pixel of the far left column C1 of pixels and subtracts the prediction data from the corresponding pixel of the far left column C1 of pixels to produce residual data. As another example, the top reference pixel H4 is used to perform predictive coding on the far right column C4 of pixels. Using the top reference pixel H4, the intra-frame coding unit generates prediction data, where prediction data=top reference pixel H4, for each pixel of the far right column C4 of pixels and subtracts the prediction data from the corresponding pixel of the far right column C4 of pixels to produce residual data.

In the horizontal prediction mode, predictive coding is performed on the 4×4 block of chrominance pixels along the horizontal direction using the left reference pixels V1-V4. Each left reference pixel is used to perform predictive coding on one of the four rows R1-R4 of pixels bordering the left reference pixel along the horizontal direction. For example, the left reference pixel V1 is used to perform predictive coding on the top row R1 of pixels. Using the top reference pixel V1, the intra-frame coding unit 112 generates prediction data, where prediction data=left reference pixel V1, for each pixel of the top row R1 of pixels and subtracts the prediction data from the corresponding pixel of the top row R1 of pixels to produce residual data. As another example, the left reference pixel V4 is used to perform predictive coding on the bottom row R4 of pixels. Using the left reference pixel V4, the intra-frame coding unit generates prediction data, where prediction data=left reference pixel V4, for each pixel of the bottom row R4 of pixels and subtracts the prediction data from corresponding pixel of the bottom row R4 of pixels to produce residual data.

In the DC prediction mode, predictive coding is performed on the 4×4 block of chrominance pixels using a mean value of the top reference pixels H1-H4 and the left reference pixels V1-V4. For example, the intra-frame coding unit 112 may generate a DC prediction value for each pixel of the 4×4 block of chrominance pixels and subtract the DC prediction value from the pixel to produce residual data.

In the plane prediction mode, predictive coding is performed on the 4×4 block of chrominance pixels using a linear function of the top reference pixels H0-H4 and the left reference pixels V1-V4. For example, the intra-frame coding unit 112 may generate a plane prediction value for each pixel of the 4×4 block of chrominance pixels and subtract the plane prediction value of the pixel from the pixel to produce residual data. For a pixel at position (x,y), where x is an integer ranging from zero to three and y is an integer ranging from zero to three, the plane prediction value of the pixel is referred to as P[x, y]. The plane prediction value of a pixel at position (x,y), P[x, y], can be expressed as:

$$P[x, y] = \text{Clip1}C((a + b*(x-1) + c*(y-1) + 16) >> 5) \quad (11)$$

$a = 16*(p[-1, 3] + p[3, -1])$
$b = (54*H + 8) >> 4$
$c = (54*V + 8) >> 4$
$H = \text{Sum}((x'+1)*(p[2+x', -1] - p[0-x', -1])), x'=0 \text{ to } 1$
$V = \text{Sum}((y'+1)*(p[-1, 2+y'] - p[-1, 0-y'])), y'=0 \text{ to } 1$,
where each of the top reference pixels H0-H4 is referred to as p [m,−1], where m is an integer ranging from minus one to three, and each of the left reference pixels V1-V4 is referred to as p [−1,n], where n is an integer ranging from zero to three.

Examples of performing predictive coding on new video content of different pixel block sizes and different pixel video data types are described below. Eight scenarios of pixel block sizes and pixel video data types of the new video content are considered for the operation of the system 100 of FIG. 1. In the eight scenarios, the new video content is a part of a 16×16 block of pixels or a part of an 8×8 block of pixels. The 16×16 block of pixels and the 8×8 block of pixels are divided into 4×4 blocks of pixels. The first scenario is that the new video content includes a 16×8 block of luminance pixels. The second scenario is that the new video content includes an 8×16 block of luminance pixels. The third scenario is that the new video content includes a single 8×8 block of luminance pixels. The fourth scenario is that the new video content includes three 8×8 blocks of luminance pixels. The fifth scenario is that the new video content includes an 8×4 block of chrominance pixels. The sixth scenario is that the new video content includes a 4×8 block of chrominance pixels. The seventh scenario is that the new video content includes a 4×4 block of chrominance pixels. The eighth scenario is that the new video content includes three 4×4 blocks of chrominance pixels.

Figure 10:
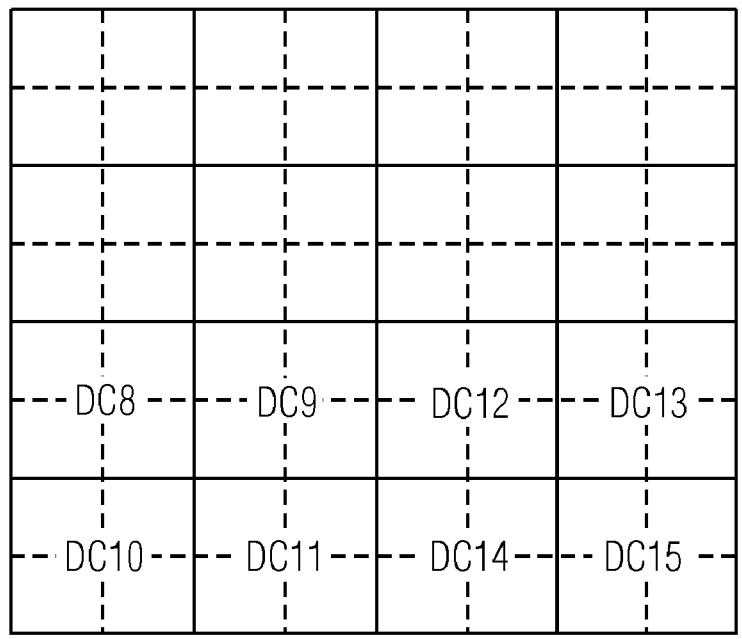
FIG. 10 depicts an exemplary 4×4 array that includes DC coefficients (amplitude of zero frequencies) of 4×4 pixel blocks of new video content under a first scenario in accordance with an embodiment of the invention.

Under the first scenario, the determining unit 110 informs the intra-frame coding unit 112 that the new video content is a 16×8 block of luminance pixels. The new video content is a part of a 16×16 block of pixels. Then, the intra-frame coding unit performs predictive coding on the 16×8 block of luminance pixels in one of the intra-frame prediction modes shown in FIGS. 2-3 or one of the intra-frame prediction modes described above with respect to FIG. 4. When one of the four intra-frame prediction modes for a 16×16 block of luminance pixels according to H.264 video compression standard is used, reference pixels for the 16×8 block of luminance are pixels bordering the left edge and the top edge of the 16×16 block of luminance pixels. The inter-frame coding unit 114 performs predictive coding on the rest of the 16×16 block of pixels using reference pixels from other video frames. If the 16×8 block is coded according to one of the prediction modes described above with respect to FIG. 2 or FIG. 4 then the transforming module 104 collects DC coefficients (amplitude of zero frequencies) of 4×4 blocks of luminance pixels of the new video content. FIG. 10 depicts an exemplary 4×4 array that includes DC coefficients (DCs) of 4×4 pixel blocks of new video content under the first scenario. As shown in FIG. 10, DC8-DC15 are DC coefficients of 4×4 pixel blocks of the new video content, which is located in the bottom 16×8 block of pixels of the 16×16 block of pixels.

Figure 11:
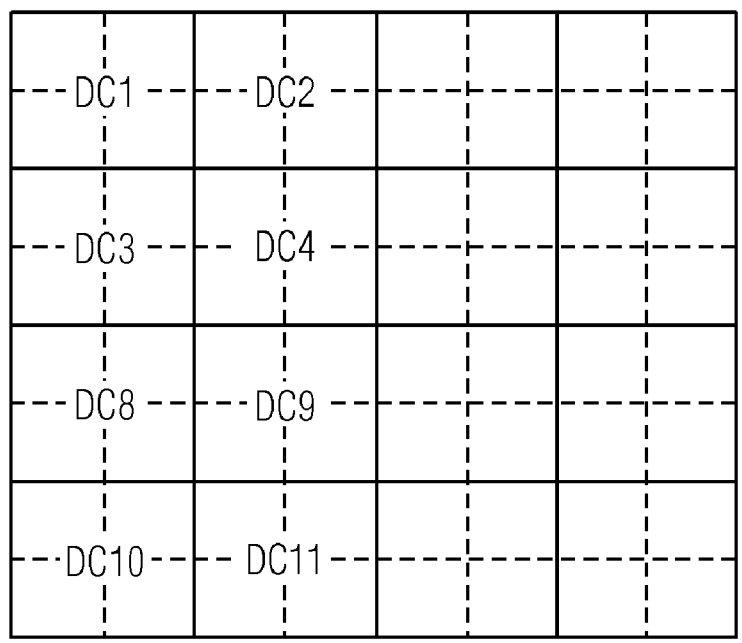
FIG. 11 depicts an exemplary 4×4 array that includes DC coefficients of 4×4 pixel blocks of new video content under a second scenario in accordance with an embodiment of the invention.

Under the second scenario, the determining unit 110 informs the intra-frame coding unit 112 that the new video content includes an 8×16 block of luminance pixels. The new video content is a part of a 16×16 block of pixels. Then, the intra-frame coding unit performs predictive coding on the 8×16 block of luminance pixels in one of the intra-frame prediction modes shown in FIGS. 2-3 or one of the intra-frame prediction modes described above with respect to FIG. 5. The inter-frame coding unit 114 performs predictive coding on the rest of the 16×16 block of pixels using reference pixels from other video frames. If the 8×16 block is coded according to one of the prediction modes described above with respect to FIG. 2 or FIG. 5 then the transforming module 104 collects DC coefficients of 4×4 blocks of luminance pixels of the new video content. FIG. 11 depicts an exemplary 4×4 array that includes DC coefficients of 4×4 pixel blocks of new video content under the second scenario. As shown in FIG. 11, DC1-DC4 and DC8-DC11 are DC coefficients of 4×4 pixel blocks of the new video content, which is located in the left 8×16 block of pixels of the 16×16 block of pixels.

Figure 12:
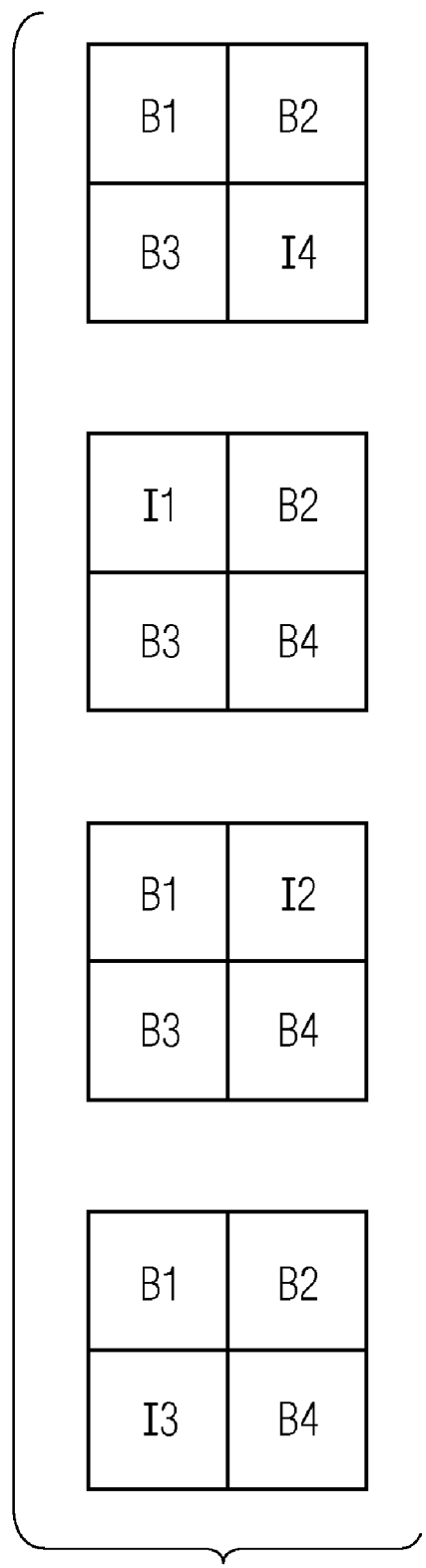
FIG. 12 depicts four different patterns in which a single 8×8 block of luminance pixels can be present in a 16×16 block of luminance pixels of a video frame in accordance with an embodiment of the invention.
Figure 13:
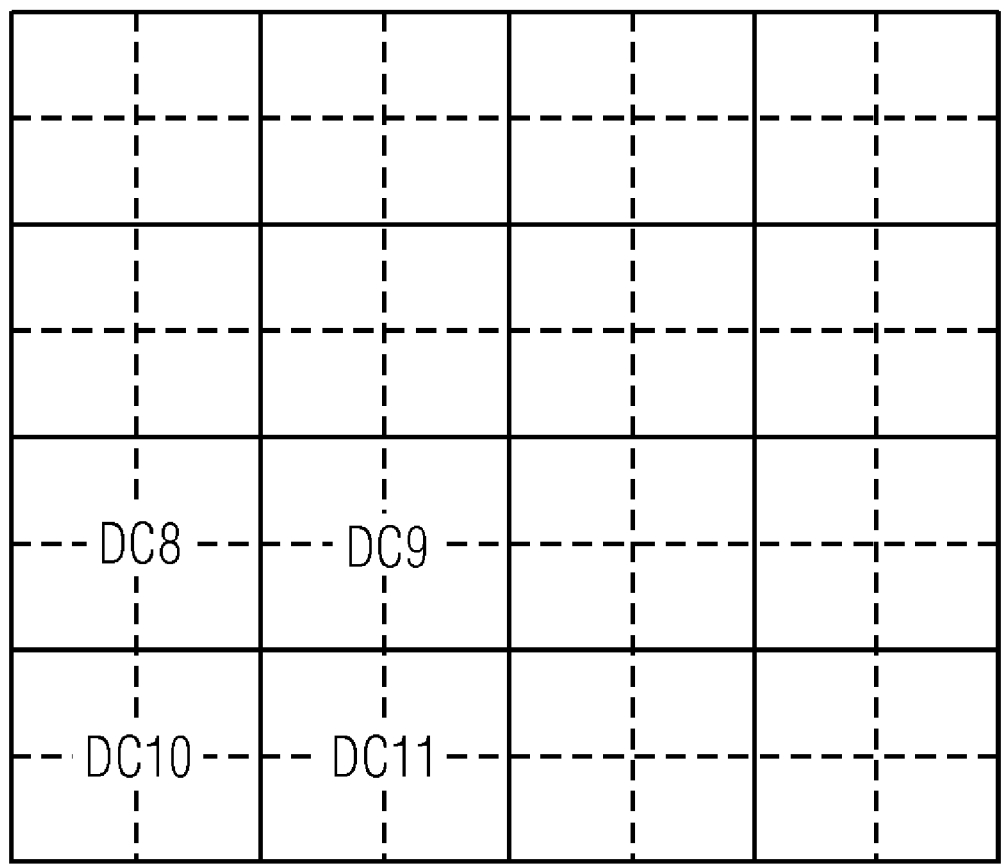
FIG. 13 depicts an exemplary 4×4 array that includes DC coefficients of 4×4 pixel blocks of new video content under a third scenario in accordance with an embodiment of the invention.

Under the third scenario, the new video content includes a single 8×8 block of luminance pixels. The new video content is a part of a 16×16 block of pixels. FIG. 12 depicts four different patterns in which a single 8×8 block of luminance pixels can be present in a 16×16 block of luminance pixels of a video frame. The blocks I1, I2, I3, and I4 are 8×8 blocks of intra-frame luminance pixels. The intra-frame coding unit 112 of FIG. 1 performs predictive coding on the 8×8 blocks I1-I4 of luminance pixels using reference pixels from the video frame. The blocks B1, B2, B3, and B4 are 8×8 blocks of inter-frame luminance pixels. The inter-frame coding unit 114 of FIG. 1 performs predictive coding on the 8×8 blocks B1-B4 of luminance pixels using reference pixels from other video frames. From the top of FIG. 12 to the bottom of FIG. 12, an 8×8 intra-frame luminance pixel block appears in the lower right corner, the upper left corner, the upper right corner, and the lower left corner of the 16×16 block of luminance pixels respectively. The determining unit 110 informs the intra-frame coding unit that the new video content includes an 8×8 block of luminance pixels. Then, the intra-frame coding unit performs predictive coding on the 8×8 block of luminance pixels in one of the intra-frame prediction modes shown in FIGS. 2-3 or one of the intra-frame prediction modes described above with respect to FIG. 6. The inter-frame coding unit performs predictive coding on the rest of the 16×16 block of pixels using reference pixels from other video frames. If the 8×8 block is coded according to one of the prediction modes described above with respect to FIG. 2 or FIG. 6 then the transforming module 104 collects DC coefficients of 4×4 blocks of luminance pixels of the new video content. FIG. 13 depicts an exemplary 4×4 array that includes DC coefficients 4×4 pixel blocks of new video content under the third scenario. As shown in FIG. 13, DC8-DC11 are DC coefficients of 4×4 pixel blocks of the new video content, which is located in the lower left 8×8 block of pixels of the 16×16 block of pixels.

Figure 14:
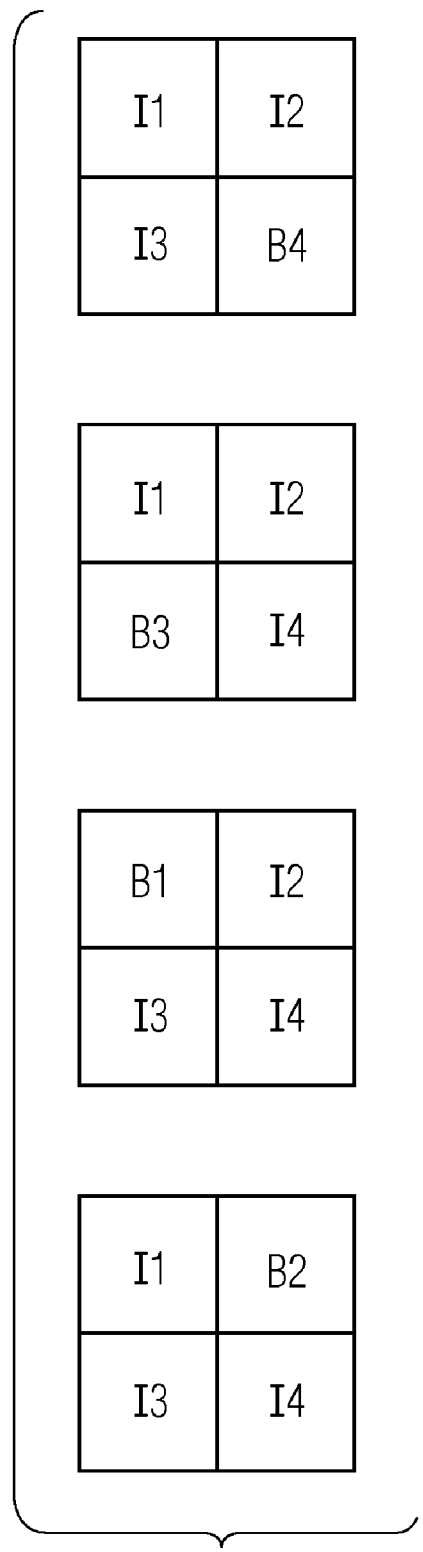
FIG. 14 depicts four different patterns in which three 8×8 blocks of luminance pixels can be present in a 16×16 block of luminance pixels of a video frame in accordance with an embodiment of the invention.
Figure 15:
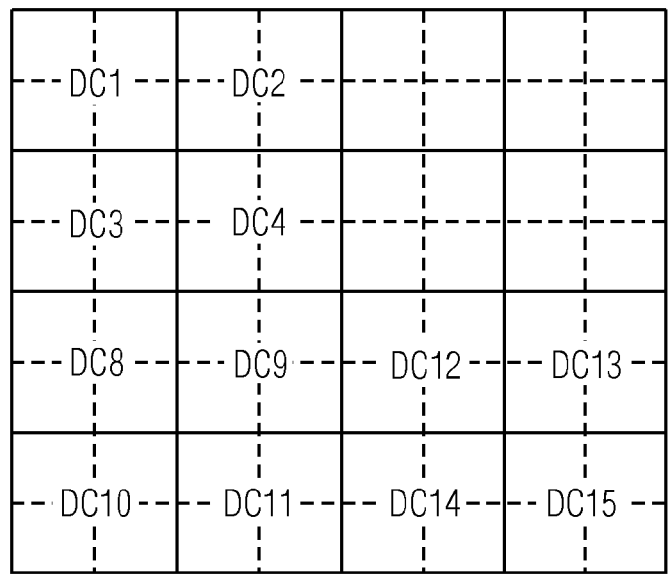
FIG. 15 depicts an exemplary 4×4 array that includes DC coefficients of 4×4 pixel blocks of new video content under a fourth scenario in accordance with an embodiment of the invention.

Under the fourth scenario, the new video content includes three 8×8 blocks of luminance pixels. The new video content is a part of a 16×16 block of pixels. FIG. 14 depicts four different patterns in which three 8×8 blocks of luminance pixels can be presented in a 16×16 block of luminance pixels of a video frame. The blocks I1, I2, I3, and I4 are 8×8 blocks of intra-frame luminance pixels. The intra-frame coding unit 112 of FIG. 1 performs predictive coding on the 8×8 blocks I1-I4 of luminance pixels using reference pixels from the video frame. The blocks B1, B2, B3, and B4 are 8×8 blocks of inter-frame luminance pixels. The inter-frame coding unit 114 of FIG. 1 performs predictive coding on the 8×8 blocks B1-B4 of luminance pixels using reference pixels from other video frames. From the top of FIG. 14 to the bottom of FIG. 14, an 8×8 inter-frame luminance pixel block is located in the lower right corner, the lower left corner, the upper left corner, and the upper right corner of the 16×16 block of luminance pixels respectively. The determining unit 110 informs the intra-frame coding unit that the new video content includes three 8×8 blocks of luminance pixels. Then, the intra-frame coding unit performs predictive coding on the three 8×8 blocks of luminance pixels in one of the intra-frame prediction modes shown in FIGS. 2-3. The inter-frame coding unit performs predictive coding on the rest of the 16×16 block of pixels using reference pixels from other video frames. The transforming module 104 collects DC coefficients of 4×4 blocks of luminance pixels of the new video content. FIG. 15 depicts an exemplary 4×4 array that includes DC coefficients of 4×4 pixel blocks of new video content under the fourth scenario. As shown in FIG. 15, DC1-DC4 and DC8-DC15 are DC coefficients of 4×4 pixel blocks of the new video content, which is located in the three 8×8 blocks (the upper left, lower left and lower right 8×8 blocks) of pixels of the 16×16 block of pixels.

Figure 16:
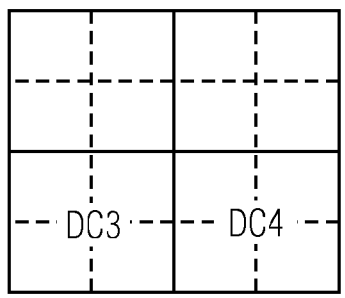
FIG. 16 depicts an exemplary 4×4 array that includes DC coefficients of 4×4 pixel blocks of new video content under a fifth scenario in accordance with an embodiment of the invention.

Under the fifth scenario, the determining unit 110 informs the intra-frame coding unit 112 that the new video content includes an 8×4 block of chrominance pixels. The new video content is a part of an 8×8 block of pixels. Then, the intra-frame coding unit performs predictive coding on the 8×4 block of chrominance pixels in one of the intra-frame prediction modes shown in FIGS. 2-3 or one of the intra-frame prediction modes described above with respect to FIG. 7. The inter-frame coding unit 114 performs predictive coding on the rest of the 8×8 block of pixels using reference pixels from other video frames. If the 8×4 block is coded according to one of the prediction modes described above with respect to FIG. 2 or FIG. 7 then the transforming module 104 collects DC coefficients of 4×4 blocks of luminance pixels of the new video content. FIG. 16 depicts an exemplary 4×4 array that includes DC coefficients 4×4 pixel blocks of new video content under the fifth scenario. As shown in FIG. 16, DC3-DC4 are DC coefficients of 4×4 pixel blocks of the new video content, which is located in the lower 8×4 block of chrominance pixels of the 8×8 block of pixels.

Figure 17:
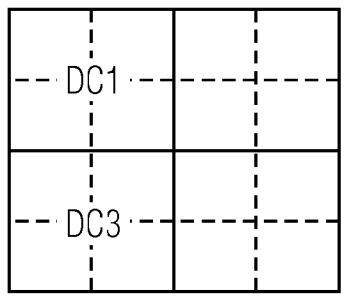
FIG. 17 depicts an exemplary 4×4 array that includes DC coefficients of 4×4 pixel blocks of new video content under a sixth scenario in accordance with an embodiment of the invention.

Under the sixth scenario, the determining unit 110 informs the intra-frame coding unit 112 that the new video content includes a 4×8 block of chrominance pixels. The new video content is a part of an 8×8 block of pixels. Then, the intra-frame coding unit performs predictive coding on the 4×8 block of chrominance pixels in one of the intra-frame prediction modes shown in FIGS. 2-3 or one of the intra-frame prediction modes described above with respect to FIG. 8. The inter-frame coding unit 114 performs predictive coding on the rest of the 8×8 block of pixels using reference pixels from other video frames. If the 4×8 block is coded according to one of the prediction modes described above with respect to FIG. 2 or FIG. 8, then the transforming module 104 collects DC coefficients of 4×4 blocks of luminance pixels of the new video content. FIG. 17 depicts an exemplary 4×4 array that includes DC coefficients of 4×4 pixel blocks of new video content under the sixth scenario. As shown in FIG. 17, DC1 and DC3 are DC coefficients of 4×4 pixel blocks of the new video content, which is located in the left 8×4 block of chrominance pixels of the 8×8 block of pixels.

Under the first, second, third, fourth, fifth and sixth scenarios, the transforming module 104 of FIG. 1 performs a Hadamard transform on the collected DC coefficients. For example, under the first scenario, the transforming module may perform a four point Hadamard transform along the horizontal direction and then a two point Hadamard transform along the vertical direction. Under the second scenario, the transforming module may perform a two point Hadamard transform along the horizontal direction and then a four point Hadamard transform along the vertical direction. Under the third scenario, the transforming module may perform a two point Hadamard transform along the horizontal direction and then a two point Hadamard transform along the vertical direction. Under the fourth scenario, the transforming module may perform a four point Hadamard transform along the horizontal direction and then a four point Hadamard transform along the vertical direction. Under the fifth scenario, the transforming module may perform a two point Hadamard transform along the horizontal direction. Under the sixth scenario, the transforming module may perform a two point Hadamard transform along the vertical direction. Order of applying Hadamard transform can be changed, i.e., vertical transform can be done first and horizontal transform can be done later, and vice versa.

Under the seventh scenario, the determining unit 110 informs the intra-frame coding unit 112 that the new video content includes a 4×4 block of chrominance pixels. The new video content is a part of an 8×8 block of pixels. Then, the intra-frame coding unit performs predictive coding on the 4×4 block of chrominance pixels in one of the intra-frame prediction modes shown in FIGS. 2-3 or one of the intra-frame prediction modes described above with respect to FIG. 9. The inter-frame coding unit 114 performs predictive coding on the rest of the pixels using reference pixels from other video frames.

Figure 18:
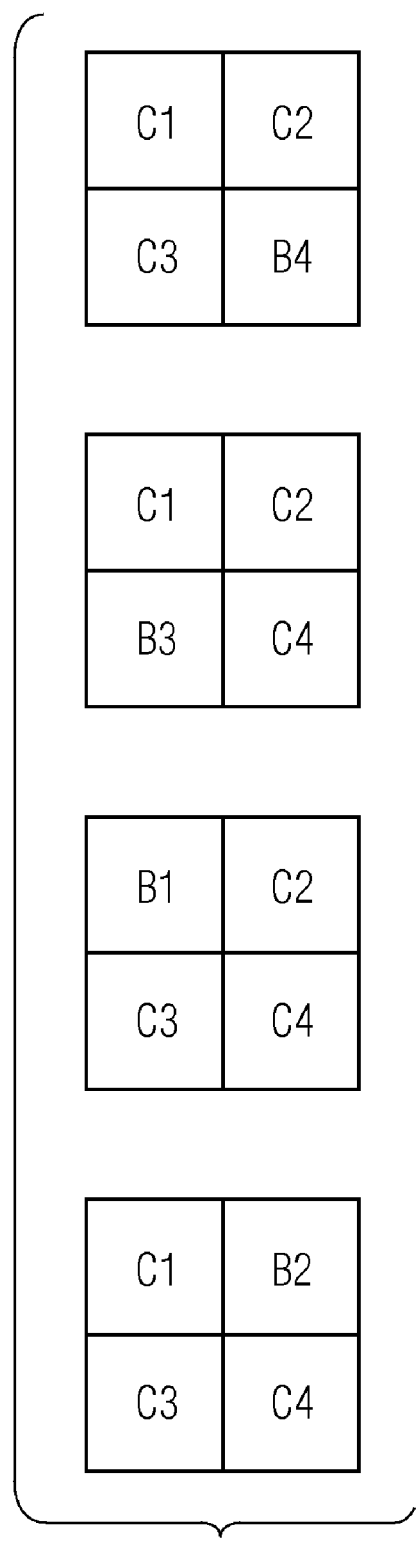
FIG. 18 depicts four different patterns that three 4×4 blocks of chrominance pixels can be present in an 8×8 block of chrominance pixels of a video frame in accordance with an embodiment of the invention.

Under the eighth scenario, the new video content includes three 4×4 blocks of chrominance pixels. The new video content is a part of an 8×8 block of pixels. FIG. 18 depicts four different patterns in which three 4×4 blocks of chrominance pixels can be present in an 8×8 block of chrominance pixels of a video frame. The blocks C1, C2, C3, and C4 are 4×4 blocks of intra-frame chrominance pixels. The intra-frame coding unit 112 of FIG. 1 performs predictive coding on the 4×4 blocks C1-C4 of chrominance pixels using reference pixels from the same video frame. The blocks B1, B2, B3, and B4 are 4×4 blocks of inter-frame chrominance pixels. The inter-frame coding unit 114 of FIG. 1 performs predictive coding on the 4×4 blocks B1-B4 of luminance pixels using reference pixels from other video frames. From the top of FIG. 18 to the bottom of FIG. 18, a 4×4 inter-frame chrominance pixel block is located in the lower right corner, the lower left corner, the upper left corner, and the upper right corner of the 16×16 block of luminance pixels respectively. Under the eighth scenario, the determining unit 110 informs the intra-frame coding unit that the new video content includes three 4×4 blocks of chrominance pixels. Then, the intra-frame coding unit performs predictive coding on the three 4×4 blocks of chrominance pixels in one of the intra-frame prediction modes shown in FIGS. 2-3. The inter-frame coding unit performs predictive coding on the rest of the 8×8 block of pixels using reference pixels from other video frames.

In an embodiment, a macroblock coded by the intra-frame coding unit 112 of FIG. 1 and the inter-frame coding unit 114 of FIG. 1 is encoded in a bitstream as a macroblock type "Intra_Inter_Macroblock." When the system 100 for video compression of FIG. 1 is used in video coding systems according to a video coding standard, the macroblock type "Intra_Inter_Macroblock" is encoded according to encoding methods of such video coding standard for coding macroblock type related syntax elements. For example, when the system for video compression of FIG. 1 is used in video coding systems according to H.264 video compression standard, macroblock type syntax elements are coded using exponential-Golomb codes or arithmetic codes. The macroblock type "Intra_Inter_Macroblock" and syntax elements related to the macroblock type "Intra_Inter_Macroblock" are encoded in the bitstream at the level of macroblock layer syntax in formatted bitstream syntax. The encoded video bitstream syntax may be hierarchically present. As example, the general structure of the encoded bitstream syntax may be as follows: (1) first, a sequence level syntax is present; (2) then, a group of picture syntax may be present; (3) then, a frame or picture level syntax is present; (4) then, a slice level syntax is present; and (5) after that, a macroblock layer syntax is present. After macroblock layer syntax is present, lower level syntax may be present. An example of macroblock level syntax is described by the following pseudo code excerpt.

```
If (mb_type = = Intra_Inter_Macroblock)
{
    If (macroblock_partition_type = = 16x8) Place Top_16x8_Inter_Block_bit.
    // When Top_16x8_Block_bit is 1, the top 16x8 block is inter-frame coded. When
```

-continued

```
Top_16x8_Block_bit is not 1, the top 16x8 block is intra-frame coded.
    If (macroblock_partition_type = = 8x16) Place Left_8x16_Inter_Block_bit.
// When Left_8x16_Inter_Block_bit is 1, the left 16x8 block is inter-frame coded.
When Left_8x16_Inter_Block_bit is not 1, the left 16x8 block is intra-frame
coded.
    If (macroblock_partition_type = = 8x8) Place Inter_8x8_block_bit's
// When Inter_8x8_block_bit is 1, the 8x8 block is inter-frame coded. When
Inter_8x8_block_bit is not 1, the 8x8 block is intra-framed coded.
    If (macroblock_partition type = = Inter_8x8_Intra_16x8_8x16)
    {
        Place Intra_16x8_8x16 bit
            // If Intra_16x8_8x16 bit is 1, mode Intra_16x8 is used. If
Intra_16x8_8x16 bit is not 1, mode Intra_8x16 is used.
        Place Intra_Top_Left_Bit
            // If Intra_Top_Left_Bit is 1, Top or Left block is intra-frame coded
block.
    }
}
```

The macroblock type "Intra_Inter_Macroblock" is present. Then macroblock partition information "Macroblock_partition_bits" is present. Then macroblock partition predictive coding type information is present.

The system 100 for video compression of FIG. 1 may be configured to compare predictive coding costs of multiple prediction modes for a macroblock to find a prediction mode with a minimum encoding cost. For example, the system for video compression of FIG. 1 may compare predictive coding costs of some or all of the prediction modes described above with respect to FIGS. 2-9 and inter-frame prediction modes according to H.264 video compression standard for a macroblock to find a prediction mode with a minimum encoding cost. Alternatively, for computation efficiency, the system for video compression of FIG. 1 may compare predictive coding costs of some or all of the prediction modes described above with respect to FIGS. 2-9 and inter-frame prediction modes according to H.264 video compression standard for a macroblock, where the reference pixels for the prediction modes of FIGS. 2-9 are the reference pixels bordering the top and left edge of the macroblock, to find a prediction mode with a minimum encoding cost. Encoding cost of a prediction mode may include the number of bits that are required to encode the prediction modes, the number of bits that are required to encode residual data of the macroblock under the prediction modes, and the product of a weighting factor and a video quality indicator. The weighting factor may be a result of trade off between compressed video file size and visual quality of compressed video. When an "Intra_Inter_Macroblock" type macroblock is used, the system for video compression of FIG. 1 may encode and place macroblock syntax information with residual data of the macroblock in the bit stream. For example, the system for video compression of FIG. 1 may first encode and place syntax information in the encoded bit stream then place the encoded residual data of the macroblock. As a result, video decoders can decode the "Intra_Inter_Macroblock" type macroblock using information from the encoded bit stream.

Figure 19:
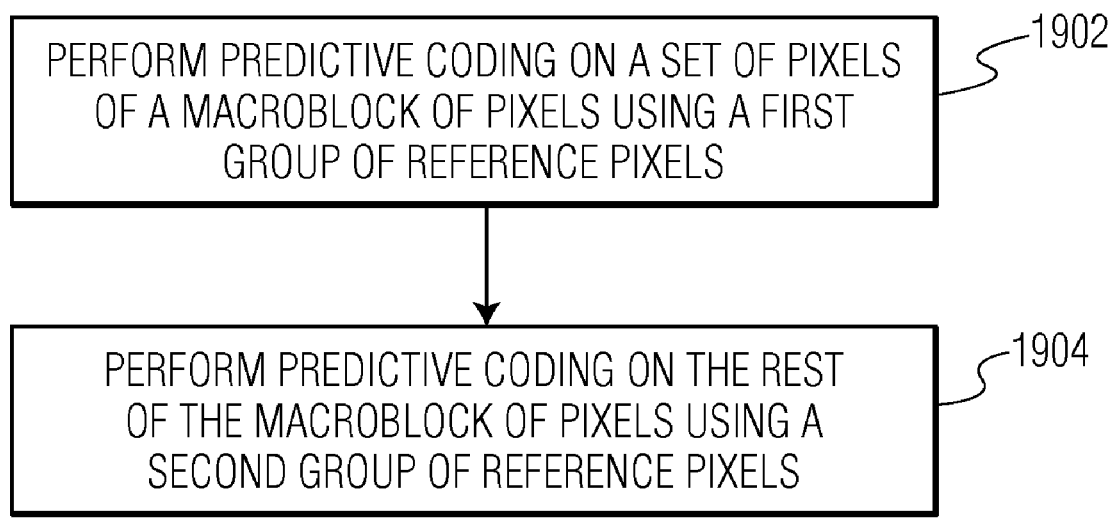
FIG. 19 is a process flow diagram of a method for video compression in accordance with an embodiment of the invention.

FIG. 19 is a process flow diagram of a method for video compression in accordance with an embodiment of the invention. At block 1902, predictive coding is performed on a set of pixels of a macroblock of pixels using a first group of reference pixels, where the macroblock of pixels and the first group of reference pixels are from a first video frame. At block 1904, predictive coding is performed on the rest of the macroblock of pixels using a second group of reference pixels, where the second group of reference pixels is from at least one other video frame.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for video compression, the method comprising:
    performing predictive coding on a set of pixels of a macroblock of pixels using a first group of reference pixels, the macroblock of pixels and the first group of reference pixels being from a video frame; and
    performing predictive coding on the rest of the macroblock of pixels using a second group of reference pixels, the second group of reference pixels being from at least one other video frame.

2. The method of claim 1 further comprising determining that new video content appears in the macroblock of pixels before performing the predictive coding on the macroblock of pixels, wherein the new video content appears in the set of pixels.

3. The method of claim 1 further comprising comparing predictive coding costs of a plurality of prediction modes, reference pixels for the predictive coding being top and left edge reference pixels bordering the macroblock or bordering a sub-block of the macroblock, before performing the predictive coding on the macroblock of pixels.

4. The method of claim 1, wherein the performing the predictive coding on the set of pixels includes performing the predictive coding on the set of pixels in at least one of a sub-block horizontal prediction mode, a sub-block vertical prediction mode, a sub-block DC prediction mode, a sub-block plane prediction mode, a horizontal prediction mode, a vertical prediction mode, a DC prediction mode, a plane prediction mode and directional prediction modes.

5. The method of claim 1, wherein the performing the predictive coding on the set of pixels of the macroblock of pixels using the first group of reference pixels includes generating a prediction data block for the set of pixels using the first group of reference pixels and subtracting the prediction data block from the set of pixels to produce a residual data block.

6. The method of claim 5 further comprising performing a Hadamard transform on at least a part of the transformed residual data block.

7. The method of claim 1, wherein the macroblock of pixels is a rectangular block of pixels.

8. The method of claim 7, wherein the first group of reference pixels borders the left edge and the top edge of the macroblock of pixels.

9. The method of claim 1, wherein the set of pixels is a rectangular block of pixels.

10. The method of claim 9, wherein the first group of reference pixels borders the left edge and the top edge of the set of pixels.

11. A system for video compression, the system comprising:
an intra-frame coding unit configured to perform predictive coding on a set of pixels of a macroblock of pixels using a first group of reference pixels, the macroblock of pixels and the first group of reference pixels being from a video frame; and
an inter-frame coding unit configured to perform predictive coding on the rest of the macroblock of pixels using a second group of reference pixels, the second group of reference pixels being from at least one other video frame.

12. The system of claim 11 further comprising a determining unit configured to determine that new video content appears in the macroblock of pixels before performing predictive coding on the macroblock of pixels, wherein the new video content appears in the set of pixels.

13. The system of claim 11 is configured to compare predictive coding costs of a plurality of prediction modes, reference pixels for the predictive coding being top and left edge reference pixels bordering the macroblock or bordering a sub-block of the macroblock, before performing the predictive coding on the macroblock of pixels.

14. The system of claim 11, wherein the intra-frame coding unit is configured to perform the predictive coding on the set of pixels in at least one of a sub-block horizontal prediction mode, a sub-block vertical prediction mode, a sub-block DC prediction mode, a sub-block plane prediction mode, a horizontal prediction mode, a vertical prediction mode, a DC prediction mode, a plane prediction mode and directional prediction modes.

15. The system of claim 11, wherein the intra-frame coding unit is configured to generate a prediction data block for the set of pixels using the first group of reference pixels and to subtract the prediction data block from the set of pixels to produce a residual data block.

16. The system of claim 15 further comprising a transforming module configured to perform a Hadamard transform on at least a part of the transformed residual data block.

17. A method for video compression, the method comprising:
performing predictive coding on a rectangular sub-block of pixels of a macroblock of pixels using a first group of reference pixels, the macroblock of pixels and the first group of reference pixels being from a video frame, the first group of reference pixels bordering the left edge and the top edge of the rectangular sub-block of pixels; and
performing predictive coding on the rest of the macroblock of pixels using a second group of reference pixels, the second group of reference pixels being from at least one other video frame.

18. The method of claim 17 further comprising determining that new video content appears in the macroblock of pixels before performing predictive coding on the macroblock of pixels, wherein the new video content appears in the rectangular sub-block of pixels.

19. The method of claim 17 further comprising comparing predictive coding costs of a plurality of prediction modes, reference pixels for the predictive coding being top and left edge reference pixels bordering the macroblock or bordering a sub-block of the macroblock, before performing the predictive coding on the macroblock of pixels.

20. The method of claim 17, wherein the performing the predictive coding on the rectangular sub-block of pixels includes performing predictive coding on the rectangular sub-block of pixels in at least one of a sub-block horizontal prediction mode, a sub-block vertical prediction mode, a sub-block DC prediction mode, a sub-block plane prediction mode, a horizontal prediction mode, a vertical prediction mode, a DC prediction mode, a plane prediction mode and directional prediction modes.

\* \* \* \* \*